US008913511B2

(12) United States Patent
Geirhofer et al.

(10) Patent No.: US 8,913,511 B2
(45) Date of Patent: Dec. 16, 2014

(54) INTERFERENCE MANAGEMENT TO SUPPORT PEER-TO-PEER COMMUNICATION IN A WIDE AREA NETWORK

(75) Inventors: Stefan Geirhofer, San Diego, CA (US); Ravi Palanki, San Diego, CA (US); Jaber Mohammad Borran, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 13/077,249

(22) Filed: Mar. 31, 2011

(65) Prior Publication Data

US 2011/0243010 A1    Oct. 6, 2011

Related U.S. Application Data

(60) Provisional application No. 61/320,227, filed on Apr. 1, 2010.

(51) Int. Cl.
| | | |
|---|---|---|
| H04L 12/28 | (2006.01) | |
| H04W 72/08 | (2009.01) | |
| H04W 52/08 | (2009.01) | |
| H04W 52/10 | (2009.01) | |
| H04W 52/24 | (2009.01) | |
| H04W 52/34 | (2009.01) | |
| H04W 52/38 | (2009.01) | |
| H04W 16/10 | (2009.01) | |
| H04W 28/04 | (2009.01) | |
| H04W 76/02 | (2009.01) | |
| H04W 88/04 | (2009.01) | |
| H04W 92/18 | (2009.01) | |
| H04W 52/14 | (2009.01) | |

(52) U.S. Cl.
CPC ............ *H04W 72/082* (2013.01); *H04W 52/08* (2013.01); *H04W 52/10* (2013.01); *H04W 52/243* (2013.01); *H04W 52/245* (2013.01); *H04W 52/343* (2013.01); *H04W 52/383* (2013.01); *H04W 16/10* (2013.01); *H04W 28/04* (2013.01); *H04W 76/023* (2013.01); *H04W 88/04* (2013.01); *H04W 92/18* (2013.01); *H04W 52/146* (2013.01); *H04W 52/248* (2013.01)
USPC ............................ 370/252; 709/227; 455/454

(58) Field of Classification Search
USPC ........................................................ 370/252
See application file for complete search history.

(56) References Cited

U.S. PATENT DOCUMENTS

| 8,081,592 B2 | 12/2011 | Sampath et al. |
|---|---|---|
| 8,140,103 B2 | 3/2012 | Wu et al. |

(Continued)

FOREIGN PATENT DOCUMENTS

| CN | 101543017 A | 9/2009 |
|---|---|---|
| JP | 2009017560 A | 1/2009 |
| WO | WO-2007051140 A2 | 5/2007 |
| WO | WO-2008118810 A1 | 10/2008 |
| WO | WO-2009009309 A1 | 1/2009 |
| WO | WO-2009009453 | 1/2009 |

OTHER PUBLICATIONS

A single-Channel Solution for Transmission Power Control in Wireless Ad hoc Networks, 2004, Alaa Muqattash and Marwan Krunz, The University of Arizona.*

(Continued)

*Primary Examiner* — Hassan Kizou
*Assistant Examiner* — Deepa Belur
(74) *Attorney, Agent, or Firm* — James K. O'Hare

(57) ABSTRACT

Techniques for performing interference management to support peer-to-peer (P2P) communication in a wide area network (WAN) are described. In an aspect, interference management may be performed in a coordinated manner for/by a set of server nodes, which may include a P2P server and at least one neighbor server node of the P2P server. The P2P server may be a UE communicating peer-to-peer with at least one other UE or P2P client. Interference management may be performed for the set of server nodes to reduce interference to the P2P server and/or the at least one P2P client. In one design, active sets may be determined for UEs. The active set of each UE may include nodes received with sufficient strength by that UE. The set of server nodes may be determined based on the active sets of the P2P server, the at least one P2P client, and possibly other UEs.

65 Claims, 10 Drawing Sheets

(56) References Cited

U.S. PATENT DOCUMENTS

| | | | |
|---|---|---|---|
| 8,391,882 B2* | 3/2013 | Sampath et al. | 455/454 |
| 8,526,410 B2 | 9/2013 | Li et al. | |
| 2006/0183423 A1* | 8/2006 | Johansson et al. | 455/41.2 |
| 2007/0202887 A1* | 8/2007 | Counts et al. | 455/456.1 |
| 2008/0220791 A1* | 9/2008 | Cho et al. | 455/450 |
| 2008/0233967 A1 | 9/2008 | Montojo et al. | |
| 2009/0019165 A1* | 1/2009 | Li et al. | 709/227 |
| 2009/0213760 A1* | 8/2009 | Shin et al. | 370/254 |
| 2010/0011110 A1 | 1/2010 | Doppler et al. | |
| 2010/0250713 A1* | 9/2010 | Sudhakar | 709/219 |
| 2010/0261469 A1* | 10/2010 | Ribeiro et al. | 455/423 |
| 2010/0309806 A1* | 12/2010 | Wu et al. | 370/252 |
| 2011/0110251 A1* | 5/2011 | Krishnamurthy et al. | 370/252 |
| 2012/0006621 A1 | 1/2012 | Casanova et al. | |
| 2012/0300662 A1* | 11/2012 | Wang et al. | 370/252 |
| 2013/0016681 A1* | 1/2013 | Gholmieh et al. | 370/329 |

OTHER PUBLICATIONS

A single-channel Solution for Transmission Power Control in wireless Ad Hoc Network, 2004, Department of Electrical and Computer Engineering. The University of Arizona. By Muqattash and Krunz.*

Signal Strength Based Link Sensing for Mobile Ad-Hoc Networks; University Paris XI, France; by Ali, Maimi, Busson and Veque, Nov. 30, 2007.*

Doppler, et al., "Device-to-Device Communication as an Underlay to LTE-Advanced Networks", Communications Magazine, IEEE Dec. 2009, vol. 47, Issue 12, pp. 42-49.

Doppler K et al., "Device-to-Device Communications; Functional Prospects for LTE-Advanced Networks", Communications Workshops, 2009. ICC Workshops 2009. IEEE International Conference on, IEEE, Piscataway, NJ, USA, Jun. 14, 2009, pp. 1-6, XP031515460, ISBN: 978-1-4244-3437-4 * abstract, chapters II, III *.

International Search Report and Written Opinion—PCT/US2011/030970—ISA/EPO—Aug. 11, 2011.

Pekka Janis and Visa Koivunen et al., "Interference-aware resource allocation for device-to-device radio underlaying cellular networks", Vehicular Technology Conference, VTC Spring 2009. IEEE 69th, Apr. 2009, pp. 1-5.

Tao Peng et al., "Interference avoidance mechanisms in the hybrid cellular and deviceto-device systems", IEEE 20th International Symposium on Personal, Indoor and Mobile Radio Communications (PIMRC 2009), IEEE, Piscataway, NJ, USA, Sep. 13, 2009, pp. 617-621, XP031659660, ISBN: 978-1-4244-5122-7 abstract, chapters I, II, III.

* cited by examiner

INTERFERENCE MANAGEMENT TO SUPPORT PEER-TO-PEER COMMUNICATION IN A WIDE AREA NETWORK

The present application claims priority to provisional U.S. Application Ser. No. 61/320,227, entitled "METHOD AND APPARATUS THAT FACILITATES INTERFERENCE MANAGEMENT AND RESOURCE PARTITIONING IN SUPPORT OF PEER-TO-PEER TRANSMISSIONS IN WIDE AREA NETWORKS," filed Apr. 1, 2010, and incorporated herein by reference in its entirety.

BACKGROUND

I. Field

The present disclosure relates generally to communication, and more specifically to techniques for supporting peer-to-peer (P2P) communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations that can support communication for a number of user equipments (UEs). A UE may communicate with a base station. A UE may also be able to communicate peer-to-peer with one or more other UEs. It may be desirable to efficiently support P2P communication for UEs.

SUMMARY

Techniques for performing interference management to support P2P communication in a WAN are described herein. A group of UEs may communicate peer-to-peer, one UE in the group may be designated as a P2P server, and each remaining UE in the group may be designated as a P2P client. In an aspect, interference management may be performed in a coordinated manner for/by a set of server nodes in order to mitigate interference to UEs communicating peer-to-peer. A server node may be a base station, a P2P server, etc.

In one design, a set of server nodes including a P2P server and at least one neighbor server node of the P2P server may be determined. The P2P server may communicate with at least one P2P client. Interference management may be performed for the set of server nodes to reduce interference to the P2P server and/or the at least one P2P client.

The set of server nodes may be determined in various manners. In one design, active sets may be determined for UEs. The active set of each UE may include nodes received with sufficient strength by that UE. The set of server nodes may be determined based on the active sets of the P2P server, the at least one P2P client, and possibly other UEs.

In one design, interference management may be performed separately for (i) P2P downlink subframes in which the P2P server transmits to the P2P client(s) and (ii) P2P uplink subframes in which the P2P client(s) transmit to the P2P server. In another design, interference management may be performed jointly for all subframes.

In one design, interference management may include association to select P2P communication or WAN communication for UEs. In another design, interference management may include resource partitioning to allocate resources to the set of server nodes. Some resources may be allocated to the P2P server for communication with the at least one P2P client and may have less interference from other nodes. In yet another design, interference management may include power control for the set of server nodes.

Various aspects and features of the disclosure are described in further detail below.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both FDD and TDD, are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
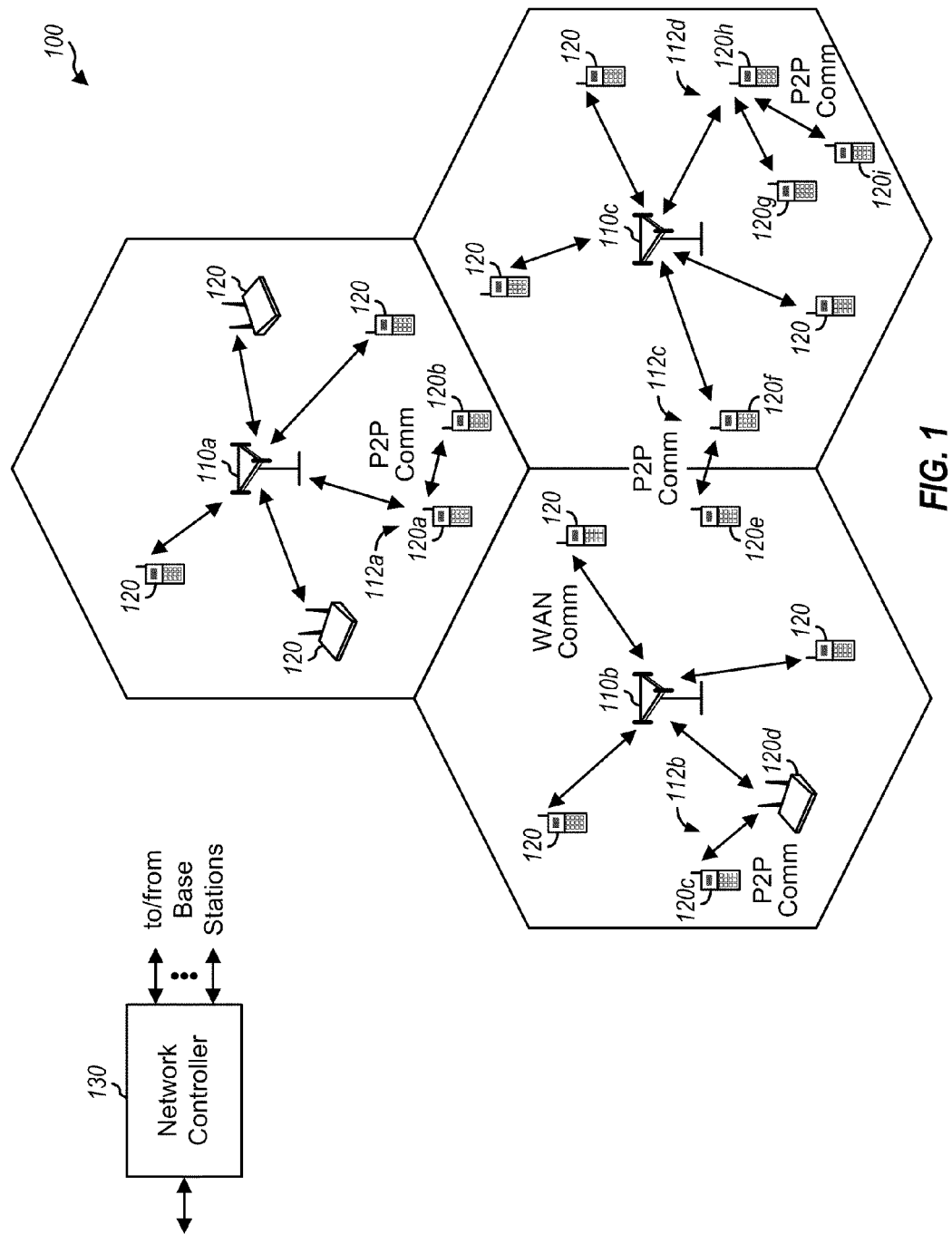
FIG. 1 shows a wireless network supporting P2P communication.

FIG. 1 shows a WAN 100, which may be a LTE network or some other WAN. WAN 100 may include a number of base stations and other network entities. For simplicity, only three base stations 110a, 110b and 110c and one network controller 130 are shown in FIG. 1. A base station may be an entity that communicates with the UEs and may also be referred to as a Node B, an evolved Node B (eNB), an access point, etc. Each base station may provide communication coverage for a particular geographic area and may support communication for the UEs located within the coverage area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, WAN 100 includes macro base stations 110a, 110b and 110c for macro cells. WAN 100 may also include pico base stations for pico cells and/or home base stations for femto cells (not shown in FIG. 1).

WAN 100 may also include relays. A relay may be an entity that receives a transmission of data from an upstream entity (e.g., a base station or a UE) and sends a transmission of the data to a downstream entity (e.g., a UE or a base station). A relay may also be a UE that relays transmissions for other UEs.

WAN 100 may be a heterogeneous network (HetNet) that includes base stations of different types, e.g., macro base stations, pico base stations, home base stations, relays, etc. These different types of base stations may have different transmit power levels, different coverage areas, and different impact on interference in WAN 100. For example, macro base stations may have a high transmit power level (e.g., 5 to 40 Watts) whereas pico and home base stations may have a lower transmit power level (e.g., 0.1 to 2 Watts). Different types of base stations may belong in different power classes having different maximum transmit power levels.

Network controller 130 may couple to a set of base stations and may provide coordination and control for these base stations. Network controller 130 may communicate with the base stations via a backhaul. The base stations may also communicate with one another via the backhaul.

UEs 120 may be dispersed throughout WAN 100, and each UE may be stationary or mobile. A UE may also be referred to as a station, a mobile station, a terminal, an access terminal, a subscriber unit, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A UE may be able to communicate with base stations, relays, other UEs, etc.

In the description herein, WAN communication refers to communication between a UE and a base station, e.g., for a call with a remote entity such as another UE. A WAN link refers to a communication link between a UE and a base station. P2P communication refers to direct communication between two or more UEs, without going through a base station. A P2P link refers to a communication link between two or more UEs engaged in P2P communication. A WAN UE is a UE that is interested or engaged in WAN communication. A P2P UE is a UE that is interested or engaged in P2P communication.

A P2P group refers to a group of two or more UEs engaged in P2P communication. In one design, one UE in the P2P group may be designated as a P2P server (or a P2P group owner), and each remaining UE in the P2P group may be designated as a P2P client. The P2P server may perform certain management functions such as exchanging signaling with a WAN, coordinating data transmission between the P2P server and the P2P client(s), etc.

In the example shown in FIG. 1, a P2P group 112a includes UEs 120a and 120b under the coverage of base station 110a. A P2P group 112b includes UEs 120c and 120d under the coverage of base station 110b. A P2P group 112c includes UEs 120e and 120f under the coverage of different base stations 110b and 110c. A P2P group 112d includes UEs 120g, 120h and 120i under the coverage of base station 110c. UEs 120a, 120c, 120e and 120h may be P2P servers for P2P groups 112a, 112b, 112c and 112d, respectively. UEs 120b, 120d, 120f, 120g and 120i may be P2P clients in their P2P groups. The other UEs 120 in FIG. 1 may be engaged in WAN communication.

In the description herein, a server node is an entity that can serve a UE. A server node may be a base station, a P2P server, etc. A node may be any entity that can transmit, such as a base station, a UE, a P2P server, a P2P client, etc.

In general, communication may be facilitated via transmissions on the downlink and uplink. For WAN communication, the downlink (or forward link) refers to the communication link from base stations to UEs, and the uplink (or reverse link) refers to the communication link from UEs to base stations. For P2P communication, P2P downlink refers to the communication link from P2P servers to P2P clients, and P2P uplink refers to the communication link from P2P clients to P2P servers.

P2P communication may offer certain advantages over WAN communication, especially for UEs located close to each other. In particular, efficiency may improve because the pathloss between two UEs may be substantially smaller than the pathloss between either UE to its serving base station. Furthermore, the two UEs may communicate directly via a single transmission "hop" for P2P communication instead of via two separate transmission hops for WAN communication—one hop for the uplink from one UE to its serving base station and another hop for the downlink from the same or different base station to the other UE.

In general, P2P communication may be supported on the same frequency channel used by WAN 100 in a co-channel P2P deployment or on a different frequency channel not used by WAN 100. Co-channel P2P deployment may be used, for example, when a separate frequency channel is not available to support P2P communication. WAN 100 may utilize FDD and may have separate frequency channels for the downlink and uplink. In this case, for a co-channel P2P deployment, some time frequency resources on the uplink frequency channel may be allocated for P2P communication. Alternatively, WAN 100 may utilize TDD and may have a single frequency channel for both the downlink and uplink. Some subframes may be allocated for the downlink, and the remaining subframes may be allocated for the uplink. In this case, for a co-channel P2P deployment, some time frequency resources in the uplink subframes may be allocated for P2P communication.

In general, WAN 100 may have downlink resources used for transmission on the downlink and uplink resources used for transmission on the uplink. The downlink resources and uplink resources may comprise different frequency and/or time resources. P2P communication may be supported on the uplink resources instead of the downlink resources. This is because P2P transmissions on downlink resources would require UEs to transmit on the downlink, which may not be allowed by regulatory bodies in many countries.

Figure 2:
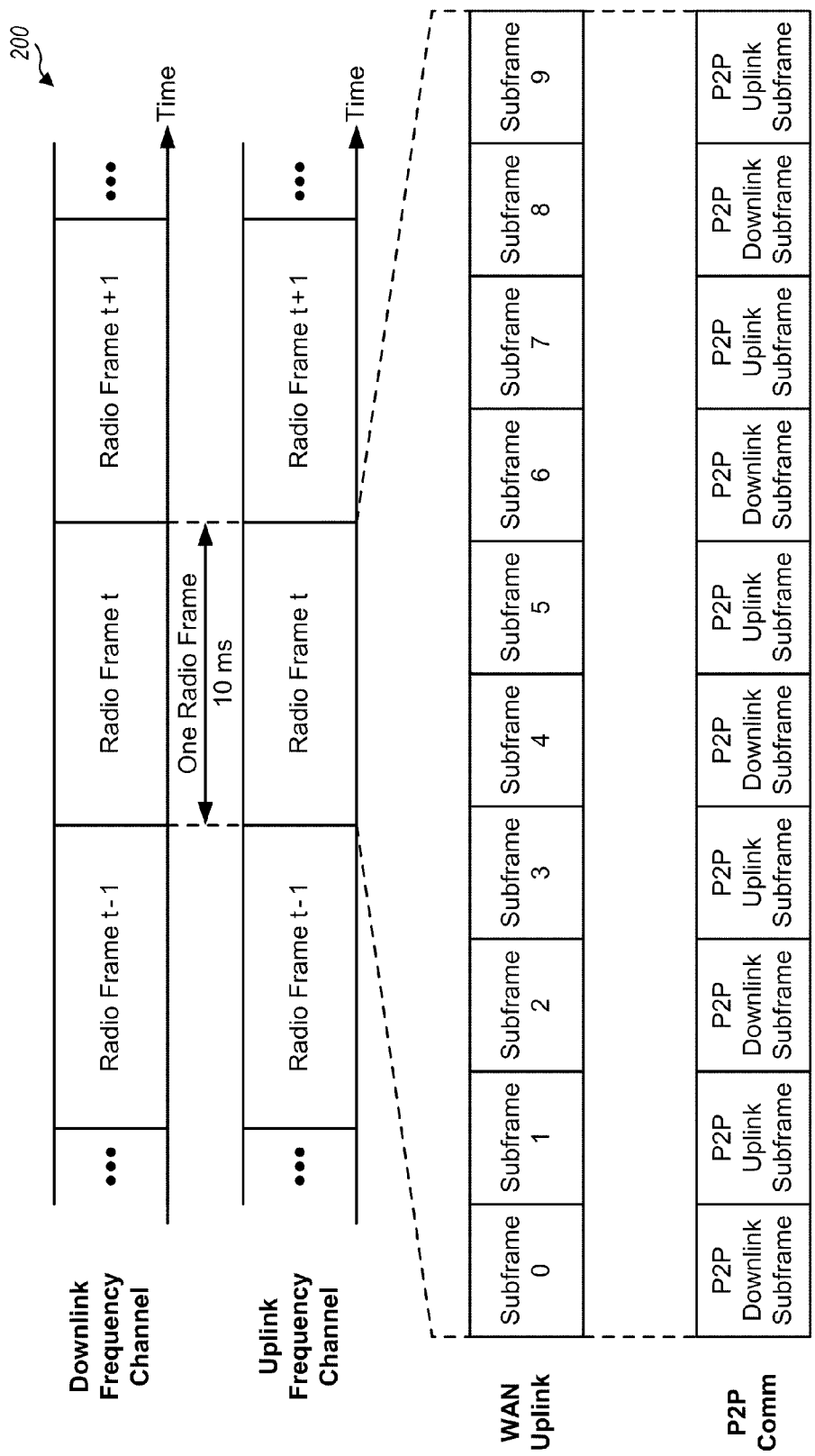
FIG. 2 shows a frame structure for frequency division duplexing (FDD).

FIG. 2 shows an exemplary frame structure 200 for FDD in LTE. For FDD, two separate frequency channels may be used for the downlink and uplink. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each slot may include L symbol periods, e.g., seven symbol periods for a normal cyclic prefix or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively. The system bandwidth may also be partitioned into subbands. Each subband may cover a range of frequencies, e.g., 1.08 MHz.

The available time frequency resources for each of the downlink and uplink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

FIG. 2 also shows a design of supporting P2P communication in an FDD deployment. In this design, the P2P downlink and P2P uplink may be supported using TDD. Hence, some subframes for the uplink may be used for the P2P downlink and may be referred to as P2P downlink subframes. Some other subframes for the uplink may be used for the P2P uplink and may be referred to as P2P uplink subframes.

Figure 3:
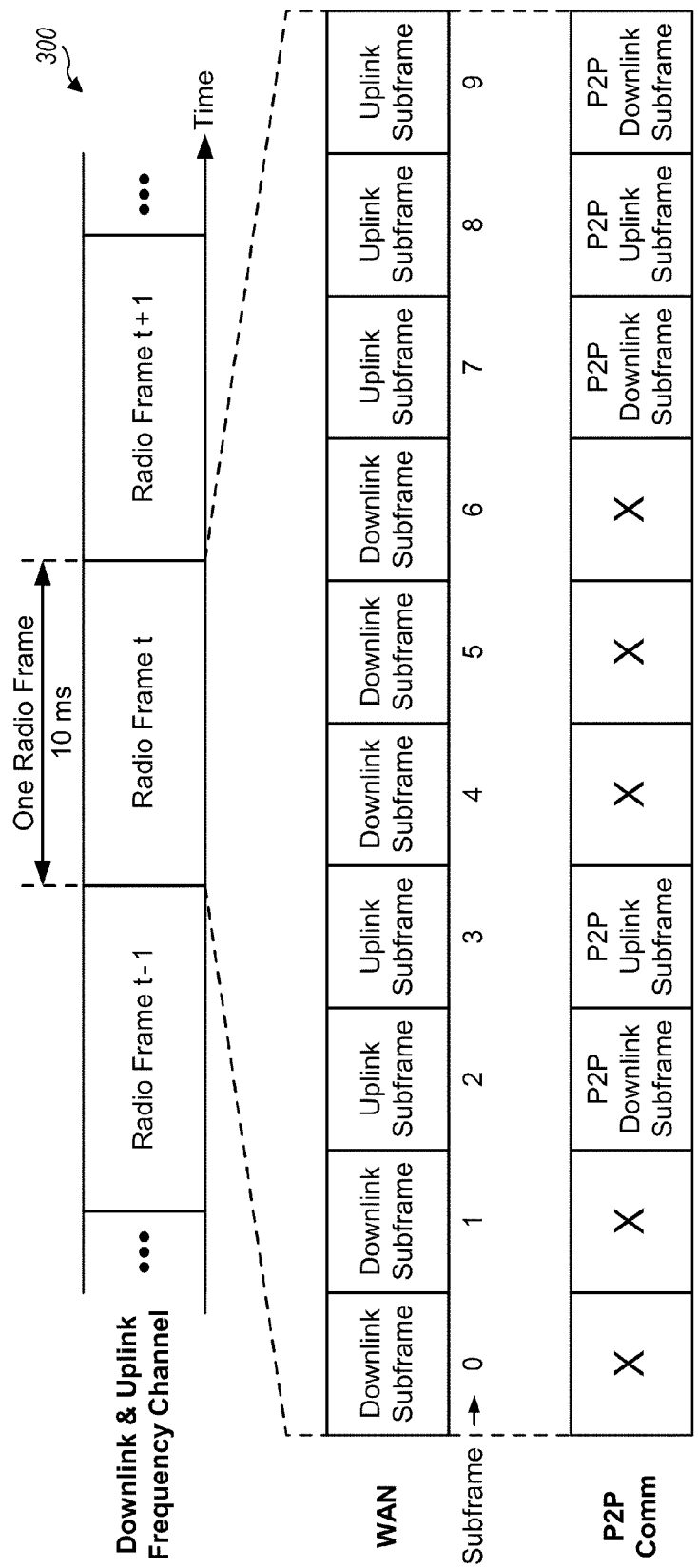
FIG. 3 shows a frame structure for time division duplexing (TDD).

FIG. 3 shows an exemplary frame structure 300 for TDD in LTE. For TDD, a single frequency channel may be used for both the downlink and uplink. The transmission timeline may be partitioned into units of radio frames, and each radio frame may be partitioned into 10 subframes with indices of 0 through 9. Subframes 0 and 5 are used for the downlink, and subframe 2 is used for the uplink. The remaining subframes 1, 3, 4, 6, 7, 8 and 9 may each be used for the downlink or uplink, or as a special subframe. In the example shown in FIG. 3, subframes 1, 4 and 6 are used for the downlink, and subframes 3, 7, 8 and 9 are used for the uplink.

FIG. 3 also shows a design of supporting P2P communication in a TDD deployment. In this design, the P2P downlink and P2P uplink may be supported using TDD. Hence, some subframes for the uplink may be used for the P2P downlink, and some other subframes for the uplink may be used for the P2P uplink.

FIGS. 2 and 3 show exemplary designs of supporting P2P communication on uplink resources in FDD and TDD deployments, respectively. In these designs, transmissions from P2P servers to P2P clients may be sent in P2P downlink subframes, and transmissions from P2P clients to P2P servers may be sent in P2P uplink subframes. P2P communication may also be supported on uplink resources in other manners. FIGS. 2 and 3 show examples in which each subframe for the uplink is designated as a P2P downlink subframe or a P2P uplink subframe. In general, a given subframe for the uplink may or may not be used for P2P communication and may be used for only P2P downlink, or only P2P uplink, or both P2P downlink and P2P uplink.

In a co-channel P2P deployment, both WAN transmissions and P2P transmissions may be sent on the same time frequency resources and may cause significant interference to one another. Interference management may be performed to mitigate interference between P2P links and WAN links in a co-channel P2P deployment.

In an aspect, interference management may be performed in a coordinated manner for/by a set of server nodes in order to mitigate interference to P2P UEs. The set of server nodes may include server nodes that may interfere with each other and may be identified as described below. Coordinated interference management may be performed for the set of server nodes using various interference mitigation techniques such as association, resource partitioning, power control, etc. Association may entail determining whether UEs should communicate peer-to-peer or via the WAN. Resource partitioning may entail allocating different resources to different server nodes and coordinating transmissions on orthogonal or quasi-orthogonal resources in time, frequency, spatial, and/or code domain in order to mitigate interference. Power control may entail setting the transmit power levels or target load levels of nodes in order to reduce interference.

In one design, active sets and neighbor sets may be defined and used for interference management. Active sets may be defined for WAN UEs and P2P UEs on a per UE basis. Neighbor sets may be defined on a per server node basis, e.g., for each base station and each P2P server. The active sets and/or neighbor sets may also be referred to by other names.

In one design, an active set for a particular UE may include nodes that may be received with sufficient signal strength by the UE and may thus cause significant interference to the UE. Significant interference may be quantified by an amount of interference exceeding a target level. This target level may be dependent on the amount of residual interference that is targeted by an interference mitigation technique being employed.

Figure 4:
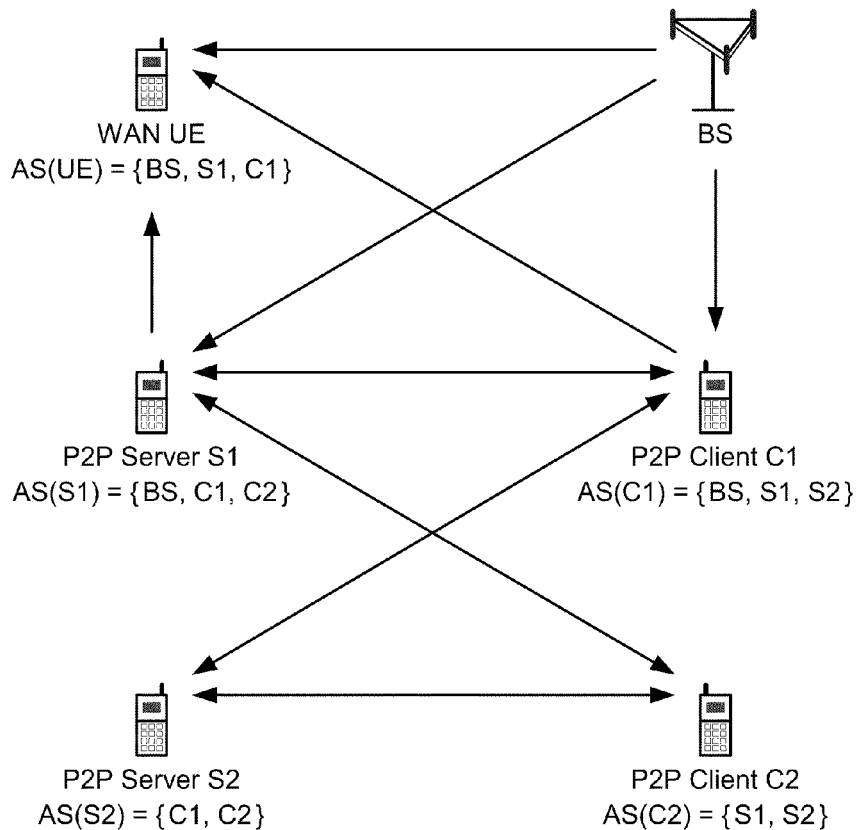
FIG. 4 shows an example of determining active sets of UEs.

FIG. 4 shows an example of determining active sets of UEs. In this design, active sets are determined based on downlink signals (e.g., synchronization signals and/or reference signals) transmitted by base stations in WAN 100 and also based on P2P signals (e.g., proximity detection signals) transmitted by P2P UEs. FIG. 4 shows a scenario with one base station (BS) communicating with one WAN UE and also two P2P servers S1 and S2 communicating with two P2P clients C1 and C2, respectively.

A UE may perform peer discovery in order to detect the presence of other UEs. For peer discovery, the UE may (i) transmit a proximity detection signal (PDS) to indicate the presence of the UE and/or (ii) detect proximity detection signals from other UEs. Peer discovery may be performed by UEs interested in P2P communication, e.g., P2P UEs. Peer discovery may also be performed by UEs not currently interested in P2P communication, e.g., WAN UEs with P2P capability but currently engaged in WAN communication. Peer discovery may be performed by some WAN UEs (instead of all WAN UEs) in order to improve interference management but may not need to be performed dynamically, which may limit the amount of overhead needed to support peer discovery by WAN UEs. Peer discovery may not be supported by legacy UEs, which may be unable to receive P2P signals on uplink resources. Implications stemming from the presence of legacy UEs are described below.

In one design, for peer discovery, a UE may estimate the channel gains (or pathloss) for nearby P2P servers and/or P2P clients on uplink resources, e.g., based on proximity detection signals received from these P2P servers and/or P2P clients. The UE may also estimate the channel gains for nearby base stations on downlink resources, e.g., based on reference signals received from these base stations.

Nodes may be added to an active set of a UE based on various criteria such as received signal strength. Received signal strength may be given by a channel gain, a channel gain difference (chan_diff), a carrier-to-thermal ratio (C/T), etc. A channel gain difference may correspond to a ratio of a first channel gain between a node and a UE to a second channel gain between the UE and its serving node. In one design, a node may be added to an active set of a UE if the received signal strength of the node, as measured at the UE, exceeds a signal strength threshold. A node may also be added to the active set based on other criteria. The number of nodes to include in an active set may be limited to a particular maximum number (i.e., the active set may have a particular maximum size) in order to reduce complexity.

In the example shown in FIG. 4, the active set (AS) of the WAN UE may include the base station (BS), P2P server S1, and P2P client C1, or AS (UE)={BS, S1, C1}. The active set of P2P server S1 may include the base station and P2P clients C1 and C2, or AS (S1)={BS, C1, C2}. The active set of P2P client C1 may include the base station and P2P servers S1 and S2, or AS (C1)={BS, S1, S2}. The active set of P2P server S2 may include P2P clients C1 and C2, or AS (S2)={C1, C2}. The active set of P2P client C2 may include P2P servers S1 and S2, or AS (C2)={S1, S2}.

The active sets of the WAN UEs and P2P clients may be sent to the serving base stations and P2P servers, respectively. The active sets collected by the base stations and P2P servers may be exchanged with other network entities (e.g., other base stations) via the backhaul and may be used to determine neighbor sets.

In one design, a neighbor set for a server node may include neighbor server nodes that may interfere with each other and should coordinate for interference management. The server nodes in the neighbor set may benefit from interference management (e.g., association, resource partitioning, power control, etc.) in order to mitigate interference. In one design, a neighbor set may be defined based on jamming conditions. For example, two server nodes may be neighbors if there exists a UE that is communicating with one server node and has the other server node in its active set. The neighbor sets of server nodes may be determined based on the active sets of UEs, as described below.

As described above, for a co-channel P2P deployment, P2P communication may utilize some uplink resources, and WAN communication may utilize the remaining uplink resources. One main difference between P2P communication and WAN communication is that P2P communication between P2P servers and P2P clients is bi-directional (although not necessarily of equal load in both directions) whereas WAN communication is uni-directional. Hence, a P2P server and a P2P client may communicate in a TDD manner on uplink resources allocated for P2P communication, e.g., as shown in FIG. 2 or 3. In contrast, for WAN communication, only UEs can transmit to their base stations on the uplink resources, but not vice versa.

In one design, neighbor sets may be defined separately for P2P downlink subframes and P2P uplink subframes. Interference management may be performed for P2P downlink subframes based on the neighbor sets defined for these subframes. Similarly, interference management may be performed for P2P uplink subframes based on the neighbor sets defined for these subframes. Performing interference management separately for P2P downlink subframes and P2P uplink subframes may improve performance since it reduces the size of neighbor sets and may therefore allow for more efficient resource usage.

Neighbor sets of server nodes in P2P downlink subframes may be determined as follows. In P2P downlink subframes, P2P servers may transmit to their P2P clients on uplink resources. In one design, neighbor sets of server nodes may be determined based on the active sets of P2P clients as well as the active sets of WAN UEs, as follows:
1. Two base stations are neighbors if there exists a WAN UE that is served by one base station and has the other base station in its active set,
2. A base station and a P2P server are neighbors if at least one of the following conditions is met:
    a. The P2P server is serving at least one P2P client and has the base station in its active set, or
    b. The base station is serving a WAN UE, which has an active set that includes a P2P client communicating with the P2P server, and
3. Two P2P servers are neighbors if there exists a P2P client that is served by one P2P server and has the other P2P server in its active set.

Condition 1 above may enable interference management within WAN 100 for base stations that may cause significant interference to one another. Condition 2 may enable interference management between WAN links and P2P links that may cause significant interference to one another. Condition 2a addresses a case where the P2P server's transmission will interfere with reception at the base station. Condition 2b addresses a case where a WAN UE will interfere with the P2P client's reception. Condition 3 may enable interference management between P2P links that may cause significant interference to one another. Server nodes may also be added to neighbor sets based on other jamming conditions.

Neighbor sets of server nodes in P2P uplink subframes may be determined as follows. In P2P uplink subframes, P2P clients may transmit to their P2P servers on uplink resources. In one design, neighbor sets for server nodes may be determined based on the active sets of P2P servers as well as the active sets of WAN UEs, as follows:
1. Two base stations are neighbors if there exists a WAN UE that is served by one base station and has the other base station in its active set,
2. A base station and a P2P server are neighbors if at least one of the following conditions is met:
    a. The P2P server receives from a P2P client, which has an active set that includes the base station, or
    b. The base station is serving a WAN UE, which has an active set that includes the P2P server, and 3. Two P2P servers are neighbors if there exists a P2P client that transmits to one P2P server and has the other P2P server in its active set.

The description above assumes that each P2P server has one P2P client. Neighbor sets may be determined in similar manner for the case of a P2P server supporting multiple P2P clients. In particular, the neighbor sets may be determined separately for P2P downlink subframes and P2P uplink subframes. In P2P downlink subframes, there is no change in how the neighbor sets are determined, even with multiple P2P clients, since from the perspective of each P2P client, transmissions in P2P downlink subframes can only originate from the P2P server. However, in P2P uplink subframes, the neighbors sets may be determined in a manner to take into account the fact that the P2P server may receive from different P2P clients in different P2P uplink subframes. Hence, different neighbor sets may be defined for different P2P uplink subframes, e.g., based on scheduling decisions on which P2P clients transmit in which P2P uplink subframes.

In a third design that may be used in P2P uplink subframes when P2P servers can support multiple P2P clients, without dynamic information on scheduling decisions, neighbor sets of server nodes may be determined based on the active sets as follows:
1. Two base stations are neighbors if there exists a WAN UE that is served by one base station and has the other base station in its active set,
2. A base station and a P2P server are neighbors if at least one of the following conditions is met:
    a. The P2P server receives from one of its P2P clients, and this P2P client has the base station in its active set, or
    b. The base station is serving a WAN UE, which has an active set that includes the P2P server, and
3. Two P2P servers are neighbors if there exists a P2P client that transmits to one P2P server, and that P2P server has an active set that includes one of the P2P clients of the other P2P server.

In the designs described above, neighbor sets may be defined separately for P2P downlink subframes and P2P uplink subframes. These designs may be used, for example, when the same P2P downlink/uplink subframe configuration is used for all P2P groups. This P2P downlink/uplink subframe configuration may specify which subframes are P2P downlink subframes and which subframes are P2P uplink subframes in each radio frame. In practice, this may often not be the case, and different P2P groups may have different P2P downlink/uplink subframe configurations, e.g., to support asymmetric traffic with different characteristics. Furthermore, there may be a lack of coordination and/or synchronization among different P2P groups, which may result in similar challenges.

In another design, active sets and neighbor sets may be defined jointly for both P2P downlink subframes and P2P uplink subframes. In this case, a given P2P UE may be interfered by transmission of any P2P server or P2P client outside of the P2P group of the P2P UE. Hence, all P2P UEs outside of the P2P group that may potentially cause interference may be added to the active set.

In a fourth design that may be used when active sets are defined jointly for P2P downlink subframes and P2P uplink subframes, neighbor sets of server nodes may be determined based on active sets as follows:
1. Two base stations are neighbors if there exists a WAN UE that is served by one base station and has the other base station in its active set,
2. A base station and a P2P server are neighbors if at least one of the following conditions is met:
    a. The P2P server or one of its P2P clients has an active set that includes the base station, or
    b. The base station is serving a WAN UE, which has an active set that includes the P2P server or one of the P2P clients, and
3. Two P2P servers A and B are neighbors if P2P server A or one of its P2P clients has an active set that includes P2P server B or one of its P2P clients.

Some exemplary designs for determining active sets and neighbor sets have been described above. Active sets and neighbor sets may also be determined in other manners.

Legacy UEs may not have P2P capabilities and may not participate in the discovery process for interference management. The legacy UEs may be unable to receive on uplink resources and may be unable to identify surrounding P2P servers and P2P clients. Hence, the legacy UEs may be unable to add P2P servers and P2P clients to their active sets and may also be unable to inform their serving base stations of the presence of these P2P servers and P2P clients. As a result, a serving base station of a legacy UE may not be aware of some interfering nodes and may therefore be unable to mitigate interference with these nodes.

Figure 5:
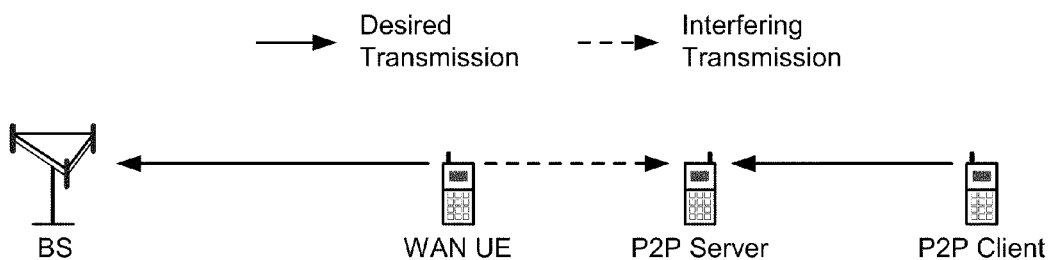
FIG. 5 shows a scenario in which a UE causes strong interference.

FIG. 5 shows a scenario in which a legacy UE causes strong interference to a P2P server. In this scenario, the legacy UE may communicate with a serving base station and may be located relatively close to the P2P server. The P2P server may communicate with a P2P client. The legacy UE may send an uplink transmission to its serving base station, and this uplink transmission may cause strong interference to the P2P server. The P2P server may receive a desired uplink transmission from the P2P client and the interfering uplink transmission from the legacy UE.

The P2P server may be unable to detect the base station for whatever reason and hence may not add the base station to its active set. The legacy UE may be unable to detect the P2P server or P2P client, e.g., due to lack of P2P capabilities.

In one design, strong interference from the legacy UE may be mitigated by detecting uplink transmissions from the legacy UE by its serving base station and/or other P2P UEs. This may be achieved by configuring the legacy UE to transmit a sounding reference signal (SRS) on the uplink. The P2P server and P2P client in FIG. 5 may be able to detect the SRS transmission from the legacy UE, estimate the channel gain (or pathloss), and add the serving base station of the legacy UE to their active sets. A base station that is associated with the P2P server may receive the active sets of the P2P server and P2P client and may initiate negotiations with the serving base station of the legacy UE via the backhaul.

Figure 6:
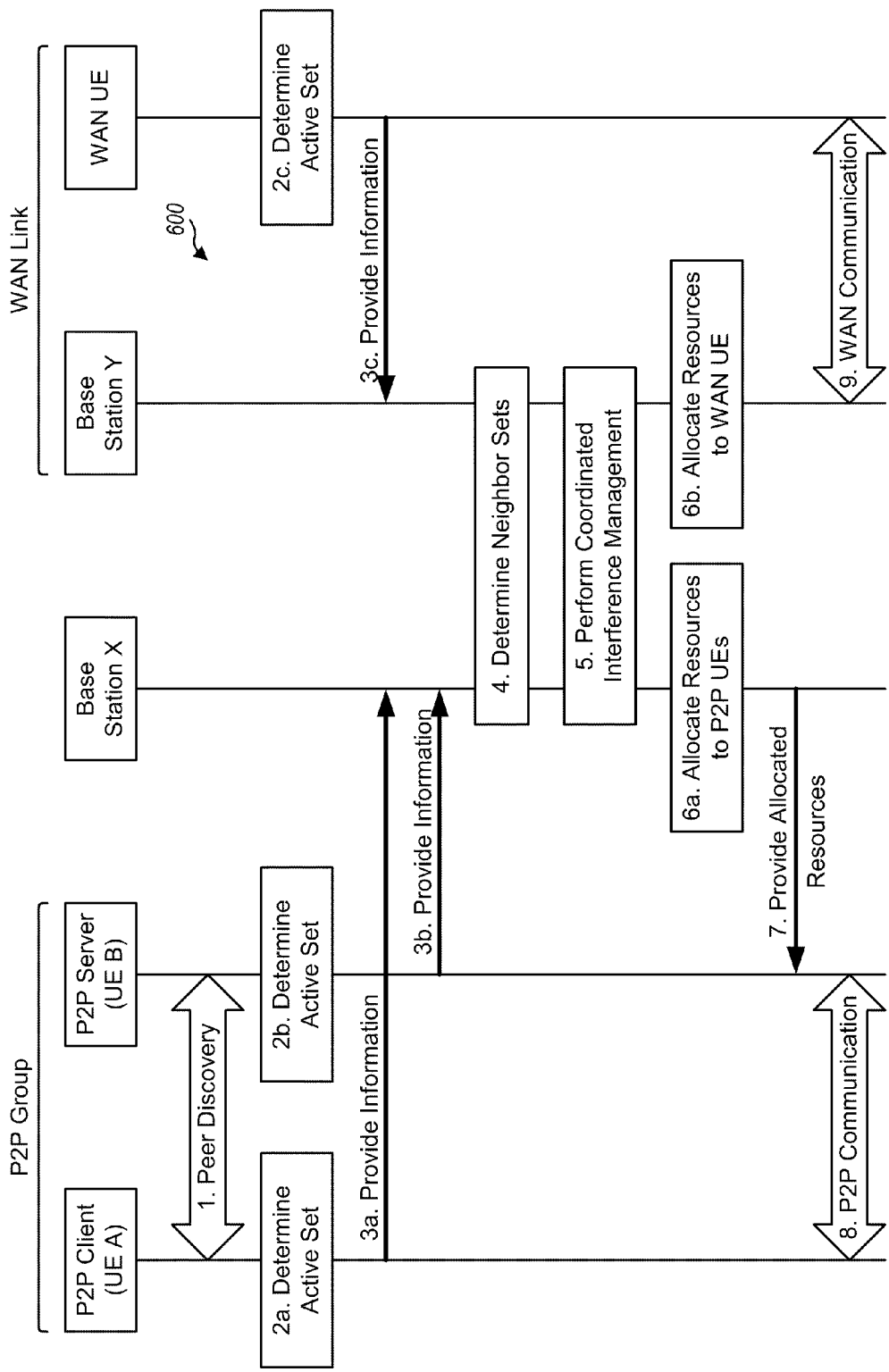
FIG. 6 shows a process for coordinated interference management.

FIG. 6 shows a flow diagram of a design of a process 600 for performing coordinated interference management. For simplicity, FIG. 6 shows one P2P group that includes two UEs A and B and is associated with a base station X. FIG. 6 also shows one WAN link between a WAN UE and a base station Y. In general, coordinated interference management may be performed for any number of WAN links, any number of P2P links/groups, any number of base stations, any number of WAN UEs, and any number of P2P UEs.

UEs A and B may perform peer discovery and may detect the presence of one another (step 1). UEs A and B may desire to establish P2P communication, e.g., autonomously or with assistance from WAN 100. UE B may be designated as a P2P server, and UE A may be designated as a P2P client.

The P2P server, P2P client, and WAN UE may determine their active sets (steps 2a, 2b and 2c). The P2P server may make measurements (e.g., for channel gain, received power, interference level, etc.) for P2P clients and base stations and may include P2P clients and base stations meeting inclusion criteria in its active set. Similarly, the P2P client may make measurements for P2P servers and base stations and may include P2P servers and base stations meeting inclusion criteria in its active set. The WAN UE may also make measurements for base stations, P2P servers, and P2P clients and may include base stations, P2P servers, and P2P clients meeting inclusion criteria in its active set. In the design shown in FIG. 6, the P2P server and P2P client may send their active sets to base station X (steps 3a and 3b), and the WAN UE may send its active set to its serving base station Y (step 3c).

In one design, base stations X and Y may collaborate to determine the neighbor sets of these base stations (step 4). This design may be able to address interference scenarios at cell edge. In another design, each base station may determine its neighbor set. In this design, base station X may determine (i) its neighbor set based on the active sets of all UEs associated with base station X and (ii) a neighbor set of the P2P server based on the active sets of the P2P client and other UEs. Similarly, base station Y may determine its neighbor set based on the active sets of all UEs associated with base station Y. For both designs, base stations X and Y (and possibly other base stations) may perform coordinated interference management (step 5). The results of the coordinated interference management may include different resources to allocate to WAN links and P2P links.

Base station X may allocate some uplink resources to the P2P group for P2P communication (step 6a). Base station X may send the allocated uplink resources to the P2P server (step 7). The P2P server and P2P client may thereafter communicate peer-to-peer based on the allocated uplink resources (step 8).

Base station Y may allocate some uplink resources to the WAN UE (step 6b). Base station Y may thereafter communicate with the WAN UE based on the allocated resources (step 9).

FIG. 6 shows a design in which a set of base stations performs coordinated interference management. In this design, each base station may perform interference management for all P2P groups associated with that base station, e.g., P2P groups under the control or within the coverage of the base station. In another design, a set of base stations and P2P servers may perform coordinated interference management. In this design, each P2P server may participate in coordinated interference management for its P2P group.

In general, coordinated interference management may result in any set of controls that can mitigate interference for P2P UEs and WAN UEs. The set of controls may be dependent on which interference mitigation technique(s) are employed, which may include power control, association, resource partitioning, etc. These different interference mitigation techniques may be utilized separately or in combination. For example, association and resource partitioning may be utilized over a long-term time scale and may be semi-static. Power control may be utilized over a short-term time scale and may be more dynamic.

In one design, power control may be used to mitigate interference between the WAN and P2P UEs. Since P2P transmissions are sent on uplink resources in a co-channel P2P deployment, P2P UEs may create significant interference to the reception of uplink transmissions from WAN UEs by nearby base stations. Conversely, WAN UEs may cause significant interference to the reception of P2P transmissions by nearby P2P servers and/or P2P clients. Power control may be performed for both P2P servers and P2P clients (e.g., in addition to power control already performed for WAN UEs) in order to mitigate severe interference conditions.

In one design, power control may be performed by associating target load levels with receiving nodes on uplink resources. These receiving nodes may include base stations, P2P servers in P2P uplink subframes, and P2P clients in P2P downlink subframes. A target load level is a target level for the load or activity at a particular node. The load may be quantified in different manners for different radio technologies. For example, the load may be quantified by an interference-over-thermal (IoT) for OFDM and SC-FDMA, a rise-over-thermal (RoT) for CDMA, etc. A target load level (e.g., a target IoT level) for each receiving node may be determined by the coordinated interference management (e.g., as part of resource partitioning) and may be indicative of a maximum data rate supported by the receiving node. The target load levels of different receiving nodes may be enforced based on open-loop or closed-loop power control using the active sets and/or neighbor sets of these nodes.

For open-loop power control, a given transmitting node may adjust its transmit power such that the target load level of each interfered receiving node of interest (or simply, each interfered node) can be satisfied. Open-loop power control may be performed based on the channel gain from the transmitting node to each interfered node. In one design, channel gains may be obtained by the transmitting node as part of the discovery process in which dominant interferers are identified and quantified. The transmitting node may report the channel gains for some or all interfered nodes to its serving base station. The serving base station may share the channel gains for the interfered nodes with other network entities (e.g., other base stations) via the backhaul, depending on which network entity makes power control decisions.

A UE may support both P2P communication and WAN communication. In this case, the UE can estimate a channel gain from a base station to the UE based on a downlink signal (e.g., a reference signal) transmitted by the base station on downlink resources. The UE may also estimate a channel gain from another UE to the UE based on a P2P signal (e.g., a proximity detection signal) transmitted by the other UE on uplink resources.

A UE may support P2P communication but not WAN communication. This may be due to the UE being able to only transmit and receive on uplink resources. In this case, the UE may be configured to transmit a sounding reference signal and/or other signals. Base stations may participate in the discovery process and may estimate the channel gains from the UE to the base stations based on the sounding reference signal transmitted by the UE.

Figure 7:
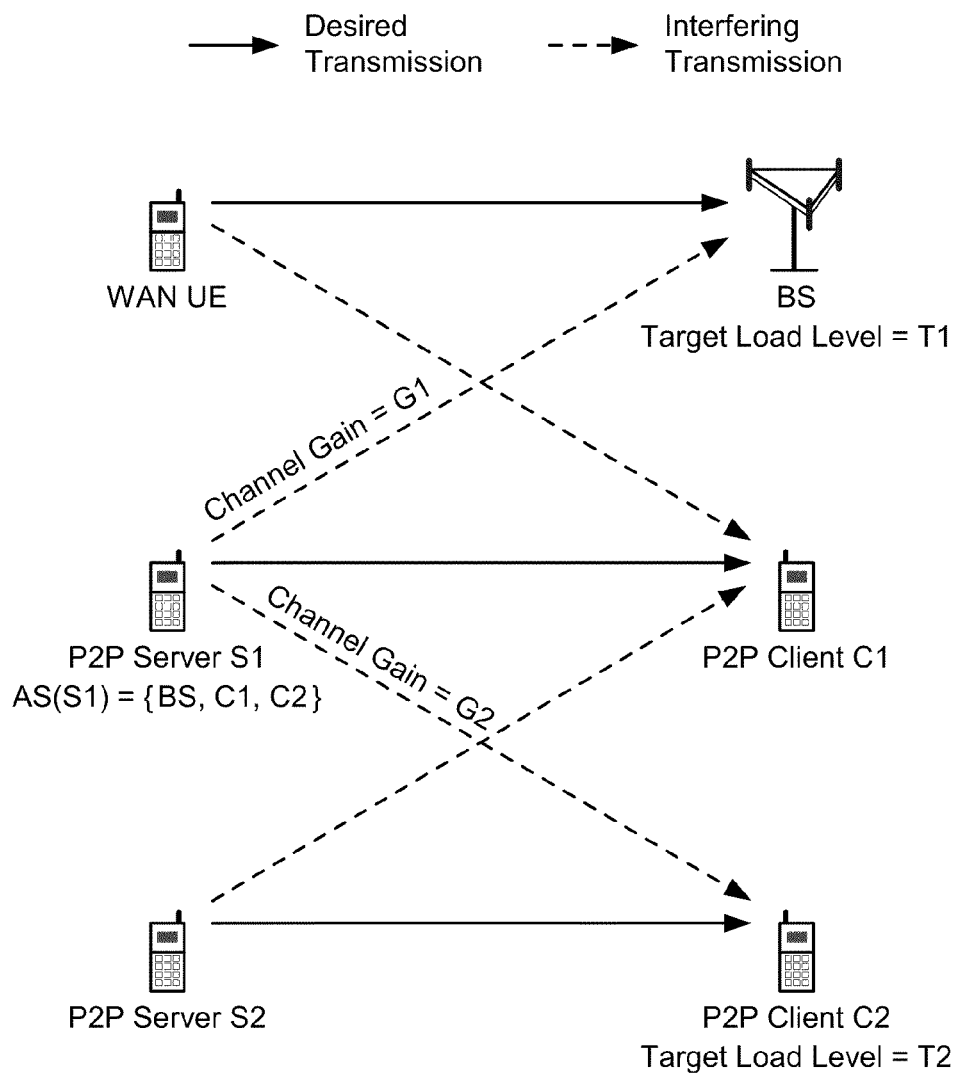
FIG. 7 shows an example of open-loop power control.

FIG. 7 shows an example of open-loop power control for a scenario with one base station BS communicating with one WAN UE and also two P2P servers S1 and S2 communicating with two P2P clients C1 and C2, respectively. In a P2P downlink subframe, the WAN UE may transmit to its serving base station, and each P2P server may transmit to its P2P client. The uplink transmission from the WAN UE may cause interference at the P2P clients. The P2P transmissions from the P2P servers may cause interference at the base station.

For clarity, FIG. 7 shows open-loop power control for only P2P server S1. P2P server S1 may have an active set that includes the base station and P2P clients C1 and C2, or AS (S1)={BS, C1, C2}. Hence, P2P server S1 may know that it may cause significant interference to the base station and P2P client C2. P2P server S1 may also know that the base station has a target load level of T1 and P2P client C2 has a target load level of T2. P2P server S1 may also measure a channel gain of G1 to the base station and a channel gain of G2 to P2P client C2. P2P server S1 may then set its transmit power level such that (i) the base station can achieve its target load level of T1 given the channel gain of G1 between the base station and P2P server S1 and (ii) P2P client C2 can achieve its target load level of T2 given the channel gain of G2 between P2P server S1 and P2P client C2.

P2P server S2 and the WAN UE may perform open-loop power control in similar manner as P2P server S1. In general, a transmitting node may have any number of interfered nodes, which may have any target load levels. The transmitting node may set its transmit power level such that the target load levels for all interfered nodes can be achieved given the channel gains between the transmitting node and the interfered nodes. In one design, the transmitting node may first determine a permitted transmit power level for each interfered node based on the channel gain and the target load level for that interfered node. The transmitting mode may then select the lowest of the permitted transmit power levels for all interfered nodes as its transmit power level.

For closed-loop power control, a transmitting node may adjust its transmit power based on some information received from one or more other nodes. In one design, base stations (and possibly P2P UEs) may broadcast overload indicators whenever they observe excessive interference. The transmitting node may receive the overload indicators from nearby base stations (and possibly P2P UEs) and may set its transmit power accordingly. In another design, the transmitting node may receive power control commands from its serving base station. The serving base station may send power control commands to its WAN UEs as well as P2P UEs, e.g., on a Physical Downlink Control Channel (PDCCH) in LTE. These designs may be supported by P2P UEs with capability to receive commands from the WAN on downlink resources while communicating peer-to-peer on uplink resources.

In another design, association and/or resource partitioning may be used to mitigate interference between the WAN and P2P UEs. Interference management may make appropriate association and routing decisions and may determine whether a given UE should communicate peer-to-peer or via the WAN. Alternatively or additionally, interference management may make appropriate resource partitioning decisions and may determine which uplink resources to use for P2P communication.

Interference management to support P2P communication may be performed in similar manner as interference management to support communication in a heterogeneous network with base stations of different types. In one design, a set of server nodes may be determined based on one or more neighbor sets of one or more server nodes. For example, the set of server nodes may be a superset of the neighbor sets of server nodes within a particular geographic area. Coordinated interference management may be performed for the set of server nodes based on a centralized scheme or a distributed scheme.

In a centralized scheme, a designated network entity may receive pertinent information for the set of server nodes and may perform interference management for all server nodes in the set. The pertinent information may include the active sets of nodes associated with the server nodes, neighbor sets of the server nodes, data requirements of different nodes, etc. The designated network entity may make decisions on association, resource partitioning, power control, etc. for the set of server nodes. The designated network entity may then provide the decisions to the server nodes.

In a distributed scheme, each server node in the set of server nodes may send pertinent information to other server nodes in the set and/or may receive pertinent information from the other server nodes. Each server node may compute local metrics for different possible actions that may be taken by that server node for interference management. A possible action may cover only association, or only resource partitioning, or both association and resource partitioning.

Resource partitioning may be performed in various manners. In one design, resources may be allocated to different nodes, and each node may use its allocated resources and not use other resources. This design can provide a "hard" allocation of resources. In another design, resources may be allocated to different nodes in a more granular manner, e.g., by adjusting transmit power levels or target load levels in a limited number of discrete steps (e.g., three discrete steps). This design can provide a more granular allocation of resources. Transmit power levels may be applicable for transmitting nodes whereas target load levels may be applicable for receiving nodes. Transmit power levels and target load levels may correspond to two resource partitioning mechanisms. In one design, transmitting nodes may advertise their transmit power levels. A receiving node may estimate an achievable data rate for a transmitting node based on a channel quality estimate for the transmitting node and the advertised transmit power level of the transmitting node. In another design, receiving nodes may advertise their target load levels. A transmitting node may estimate an achievable data rate for a receiving node based on (i) a transmit power level of the transmitting node determined based on the advertised target load levels of nearby receiving nodes and (ii) a channel quality estimate for the receiving node. For clarity, resource partitioning with adjustable transmit power levels is described below. Resource partitioning with adjustable target load levels may also be performed. From a system's perspective, enforcing target load levels at UEs as described herein may be an innovative concept that can provide good performance.

In one design, possible actions for resource partitioning may include one or more of the following:

Server node p claims resource r and increases its transmit power on resource r,

Server node p grants resource r and decreases its transmit power on resource r,

Server node p requests resource r from one or more other server nodes and asks the other server node(s) to decrease their transmit power on resource r, Server node p grants resource r to one or more other server nodes and tells the other server node(s) to increase their transmit power on resource r, Server node p claims resource r from one or more other server nodes and (i) increases its transmit power on resource r and (ii) asks the other server node(s) to decrease their transmit power on resource r, and Server node p grants resource r to one or more other server nodes and (i) decreases its transmit power on resource r and (ii) tells the other server node(s) to increase their transmit power on resource r.

In one design, possible actions for both association and resource partitioning may include one or more of the following:

Server node p hands out UE t to another server node q without granting any resources to serve UE t, Server node p receives (or hands in) UE t from another server node q without receiving any resources to serve UE t, Server node p hands out one or more UEs to one or more other server nodes and also grants one or more resources to serve the UE(s), Server node p receives one or more UEs from one or more other server nodes and also requests one or more resources to serve the UE(s).

Other possible actions for association and/or resource partitioning may also be evaluated.

In one design, server node p may compute a local metric for each possible action z based on a sum rate utility function as follows:

$$U(p, z) = \sum_{S(t)=p} R(t, z),  \quad \text{Eq (1)}$$

where

R(t, z) is a rate achieved by UE t on the available resources for action z,

S(t) is a serving node of UE t, and

U(p, z) is a local metric for server node p for action z.

The rate R(t, z) for each UE for possible action z may be computed based on the transmit power levels for different nodes associated with possible action z. The summation in equation (1) is over all UEs having server node p as their serving node. In general, the local metric for server node p for each possible action may be dependent on the utility function selected for use. The local metric may be computed for each possible action and may be exchanged with other server nodes and used to select the possible action having the best utility.

Figure 8:
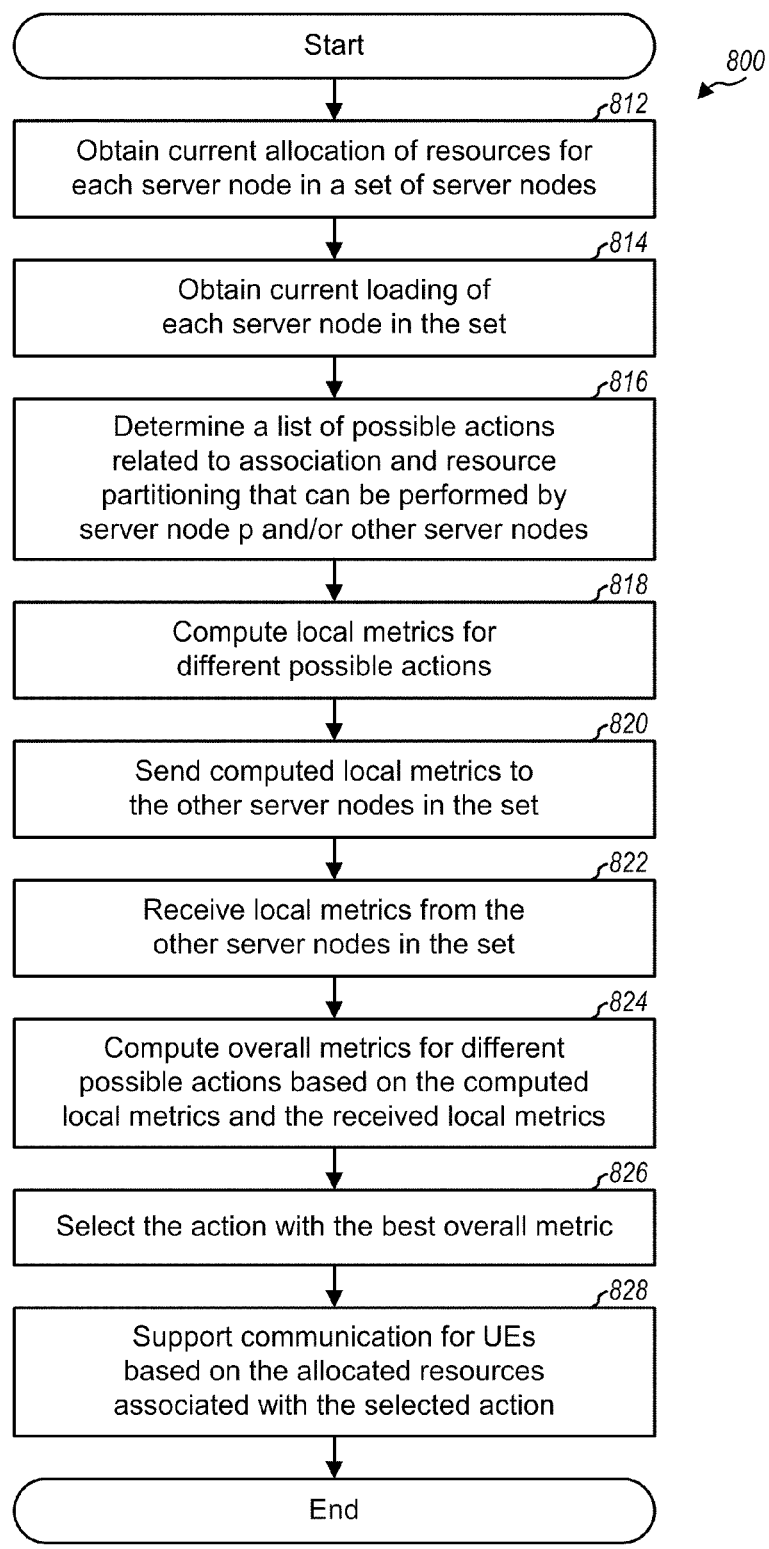
FIG. 8 shows a process for performing resource partitioning.

FIG. 8 shows a design of a process 800 for performing association and resource partitioning for coordinated interference management based on the distributed scheme. Process 800 may be performed by each server node in a set of server nodes, which may be denoted as set Q. For clarity, process 800 is described below for server node p, which may be one of the server nodes in set Q. Set Q may be the neighbor set of server node p or may be determined in other manners.

Server node p may obtain the current allocation of resources for each neighbor server node in set Q (step 812). In one design, the allocation of resources for each server node may be given by a list of allowed transmit power levels for that server node for available time frequency resources, one allowed transmit power level for each available time frequency resource. Server node p may also obtain the current loading of each neighbor server node in set Q (step 814). The loading of each server node may be defined by the number of UEs currently served by the server node, the percentage of resources used by the server node, etc. Server node p may obtain the current allocated resources and the current loading of the neighbor server nodes in set Q via the backhaul or through other means. Server node p may also advertise its current allocated resources and/or loading via the backhaul to the neighbor server nodes and possibly over the air for use by UEs for initial access or handover decisions.

Server node p may determine a list of possible actions related to association and resource partitioning that can be performed by server node p and/or other server nodes in set Q (step 816). A possible action for resource partitioning may cover a specific allocation of resources for server node p as well as a specific allocation of resources for each neighbor server node in set Q. For example, a possible action for resource partitioning may entail server node p changing its transmit power on a particular resource and/or one or more neighbor server nodes changing their transmit power on the resource. A possible action for association and resource partitioning may cover a UE being handed over to another server node in set Q and a grant of an available resource (e.g., a higher transmit power level) to the other server node. Some possible actions for association and resource partitioning are described above. The list of possible actions may be denoted as A.

Server node p may compute local metrics for different possible actions in set A (block 818). For example, a local metric based on the sum rate utility function may be computed as shown in equation (1). The local metrics for different possible actions may be used by server node p as well as the neighbor server nodes to compute overall metrics for different possible actions. Server node p may send its computed local metrics U(p, z), for z∈A, to the neighbor server nodes in set Q (block 820). Server node p may also receive local metrics U(q, z), for q∈Q, q≠p, and z∈A, from each neighbor server node q in set Q (block 822). Server node p may compute overall metrics for different possible actions based on its computed local metrics and the received local metrics (block 824). For example, an overall metric based on the sum rate utility function in equation (1) may be computed for each possible action z, as follows:

$$V(z) = U(p, z) + \sum_{q \in Q, q \neq p} U(q, z),  \quad \text{Eq (2)}$$

where V(z) is an overall metric for possible action z. The summation in equation (2) is over all server nodes in set Q except for server node p.

After completing the metric computation, server node p may select the action with the best overall metric (block 826). Each neighbor server node in set Q may similarly compute overall metrics for different possible actions and may also select the action with the best overall metric. Server node p and the neighbor server nodes should select the same action if they operate on the same set of local metrics. Each server node may then operate based on the selected action, without having to communicate with one another regarding the selected action. However, server node p and its neighbor server nodes may operate on different local metrics and may obtain different best overall metrics. This may be the case, for example, if server node p and its neighbor server nodes have different neighbor sets. In this case, server node p may negotiate with the neighbor server nodes to determine which action to take. This may entail exchanging overall metrics for some promising actions between the server nodes and selecting the action that can provide good performance for as many server nodes as possible.

The selected action may be associated with a specific allocation of resources for server node p and possibly specific association updates for server node p. Server node p may perform handovers of UEs based on the association updates, if any. Server node p may support communication for its UEs (including P2P UEs within its control or coverage area) based on the resources allocated to server node p by the selected action (block 828). In one design, the allocated resources may be defined by a list of transmit power levels, one specific transmit power level for each available resource. Server node p may use the specified transmit power level for each available resource.

FIG. 8 shows an exemplary design of performing association and resource partitioning. In this design, a set of server nodes may negotiate for interference management by exchanging utility messages, which may be used to perform utility maximization based on projected rates R(t, z). The projected rates may be determined based on an assumption that target load levels can be enforced through power control among the different nodes. The design in FIG. 8 may be robust in with the absence of accurate power control and may perform well even in such a scenario.

Resource partitioning may be performed in a manner to account for attributes that may be particular to P2P communication. For example, in a heterogeneous network, negotiation messages may be more readily exchanged between base stations via a wired backhaul. In contrast, in a P2P scenario, negotiation messages may be exchanged over the air between P2P servers and the WAN, which may limit the amount of negotiations that can take place between the P2P servers and the WAN. For example, the P2P servers may be able to negotiate with only their serving base station or a limited number of nearby base stations.

In one design, coordinated interference management may be performed by P2P servers or by their serving base stations for the P2P servers (e.g., in a semi-static manner). The P2P servers may then be able to make independent scheduling decisions for their P2P clients based on the outcome of the association and resource partitioning.

In another design, interference management may be achieved by having the P2P UEs operate under the control of their serving base stations (e.g., in terms of scheduling decisions for the P2P UEs). In this design, the serving base stations may participate in coordinated interference management for their P2P UEs and may also make scheduling decisions for the P2P UEs based on the outcome of the association and resource partitioning. This design may utilize more overhead to exchange more information between the base stations and P2P servers but may enable tighter interference coordination between the WAN and P2P UEs. The P2P UEs may be able to concurrently communicate with both the WAN and other P2P UEs and may be able to receive control information (e.g., scheduling decisions) from their serving base stations (e.g., in different subframes).

For clarity, techniques for performing coordinated interference management to support P2P communication on uplink resources in a co-channel P2P deployment have been described above. These techniques may also be used for coordinated interference management to support P2P communication on downlink resources, or on separate resources (e.g., a separate frequency channel) not used for the WAN.

Figure 9:
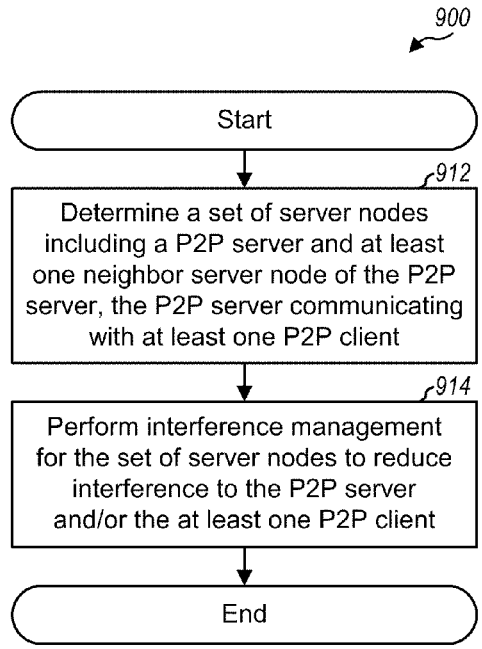
FIG. 9 shows a process for performing interference management.

FIG. 9 shows a design of a process 900 for performing interference management. Process 900 may be performed by a P2P server, a base station, or a designated network entity. A set of server nodes including a P2P server and at least one neighbor server node of the P2P server may be determined (block 912). The P2P server may communicate with at least one P2P client. Interference management may be performed for the set of server nodes to reduce interference to the P2P server and/or the at least one P2P client (block 914).

The set of server nodes may include at least one base station and/or at least one other P2P server. In one design, the set of server nodes may include first and second base stations, with the first base station serving a UE that receives the second base station with sufficient signal strength. In another design, the set of server nodes may include a base station that is received with sufficient signal strength by one or more of the at least one P2P client. In yet another design, the set of server nodes may include a base station serving a UE that receives the P2P server with sufficient signal strength. In yet another design, the set of server nodes may include a base station serving a UE that receives one or more of the at least one P2P client with sufficient signal strength. In yet another design, the set of server nodes may include a second P2P server that is received with sufficient signal strength by one or more of the at least one P2P client. The set of server nodes may also be determined in other manners, e.g., based on any of the designs described above.

In one design, each P2P client may be associated with an active set that includes at least one node received with sufficient signal strength by that P2P client. The P2P server may also be associated with an active set. The set of server nodes may be determined based on the active sets of the at least one P2P client, the P2P server, and possibly one or more UEs served by one or more base stations.

In one design, interference management may be performed separately for P2P downlink subframes and P2P uplink subframes. Interference management may be performed for the set of server nodes in downlink subframes for the P2P server and also in uplink subframes for the P2P server. In another design, interference management may be performed jointly for all subframes.

In one design, interference management may include association to select P2P communication or WAN communication for UEs. In another design, interference management may include resource partitioning to allocate resources to the set of server nodes. In yet another design, interference management may include power control for the set of server nodes. Interference management may include other interference mitigation techniques or a combination of interference mitigation techniques.

In one design, open-loop power control may be performed to reduce interference to the P2P server and/or the at least one P2P client. For example, a transmit power level of the P2P server may be set to mitigate interference to at least one node not served by the P2P server. The transmit power level of the P2P server may be set by (i) estimating at least one channel gain for the at least one node, (ii) determining at least one target load level for the at least one node, and (iii) setting the transmit power level of the P2P server based on the at least one channel gain and the at least one target load level for the at least one node.

In another design, closed-loop power control may be performed to reduce interference to the P2P server and/or the at least one P2P client. For example, a transmit power level of a P2P client may be set to mitigate interference to at least one node. The transmit power level of the P2P client may be set by (i) estimating a received power of the P2P client at the P2P server, (ii) determining a power control command for the P2P client based on the received power of the P2P client and a target load level for the P2P server, and (iii) sending the power control command to the P2P client.

For resource partitioning, resources may be allocated to the P2P server for communication with the at least one P2P client. The allocated resources may have reduced interference from the at least one neighbor server node and/or UEs communicating with the at least one neighbor server node. In one design, the allocated resources for the P2P server may comprise a set of transmit power levels for a set of resources available for communication between the P2P server and the at least one P2P client. In another design, the allocated resources for the P2P server may comprise a set of target load levels for a set of resources available for communication between the P2P server and the at least one P2P client. In one design of resource partitioning, a target load level for the P2P server and/or at least one target load level for the at least one P2P client may be determined. In another design of resource partitioning, a transmit power level for the P2P server and/or at least one transmit power level for the at least one P2P client may be determined.

In one design, interference management (e.g., resource partitioning) may be negotiated by the P2P server. In another design, interference management may be negotiated by a base station associated with (e.g., serving) the P2P server. In one design, the P2P server may control communication with the at least one P2P client. In another design, a base station associated with the P2P server may schedule the P2P server and the at least one P2P client for data transmission.

In one design, a UE causing strong interference to the P2P server and/or the at least one P2P client may be identified. A serving base station of this UE may participate in interference management to mitigate interference caused by the UE.

Figure 10:
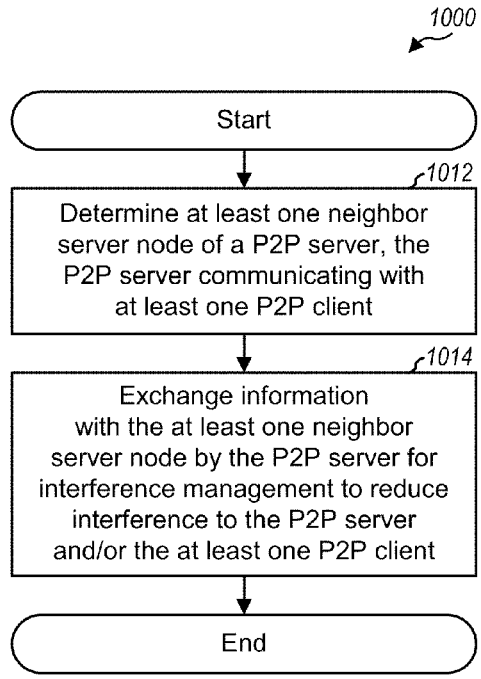
FIG. 10 shows a process for cooperating for interference management.

FIG. 10 shows a design of a process 1000 for performing interference management. Process 1000 may be performed by a P2P server (as described below) or by some other entity. The P2P server may communicate with at least one P2P client and may determine at least one neighbor server node of the P2P server (block 1012). The at least one neighbor server node and the P2P server may be members of a set of server nodes cooperating for interference management. The P2P server may exchange information with the at least one neighbor server node for interference management in order to reduce interference to the P2P server and/or the at least one P2P client (block 1014).

In one design of block 1014, the P2P server may send information indicative of at least one active set of the at least one P2P client. The active set of each P2P client may include at least one node received with sufficient signal strength by the P2P client. In another design, the P2P server may send information indicative of a neighbor set of the P2P server. The neighbor set may include at least one server node with which to coordinate interference management. In yet another design, the P2P server may send information indicative of local metrics computed by the P2P server. Each local metric may be indicative of performance for a possible action by the P2P server for interference management.

In one design, the P2P server and the at least one neighbor server node may cooperate for interference management in downlink subframes in which the P2P server transmits to the at least one P2P client. In another design, the P2P server and the at least one neighbor server node may cooperate for interference management in uplink subframes in which the at least one P2P client transmits to the P2P server.

In one design, the P2P server may exchange information with the at least one neighbor server node to allocate resources to the P2P server for communication with the at least one P2P client. The exchanged information may be used to determine a target load level for the P2P server and/or at least one target load level for the at least one P2P client. The exchanged information may also be used to determine a transmit power level for the P2P server and/or at least one transmit power level for the at least one P2P client.

Figure 11:
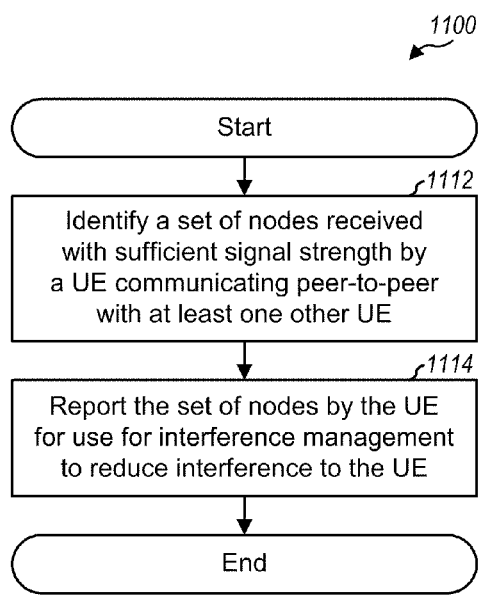
FIG. 11 shows a process for supporting interference management.

FIG. 11 shows a design of a process 1100 for supporting interference management. Process 1100 may be performed by a UE (as described below) or by some other entity. The UE may communicate peer-to-peer with at least one other UE and may identify a set of nodes received with sufficient signal strength by the UE (block 1112). The UE may report the set of nodes for use for interference management to reduce interference to the UE (block 1114).

In one design, the UE may be a P2P server communicating with at least one P2P client. The set of nodes may comprise at least one UE and/or at least one other P2P client received with sufficient signal strength and causing strong interference to the P2P server. In another design, the UE may be a P2P client communicating with a P2P server. The set of nodes may comprise at least one UE and/or at least one other P2P server received with sufficient signal strength and causing strong interference to the P2P client.

Figure 12:
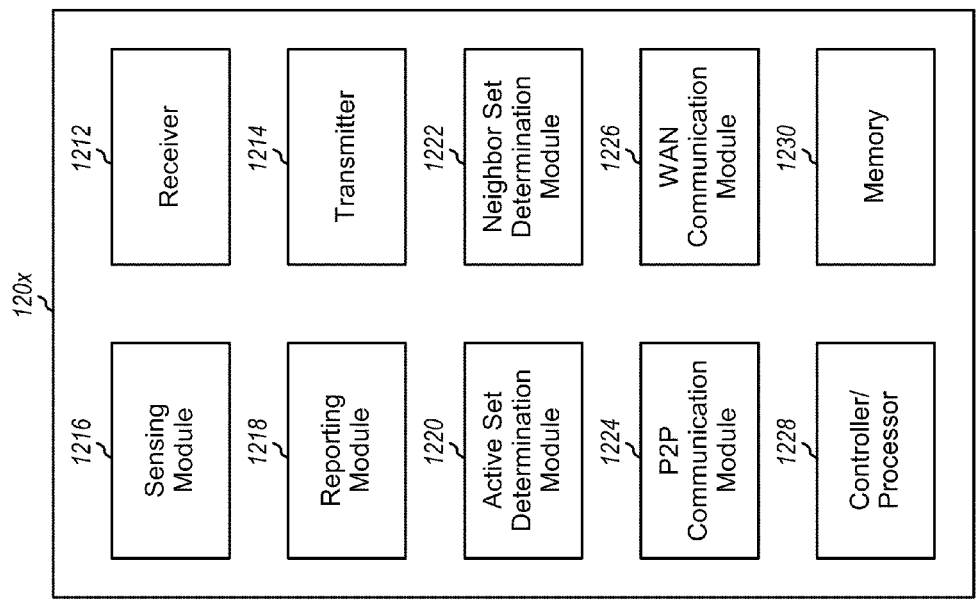
FIG. 12 shows a block diagram of a UE capable of P2P communication.

FIG. 12 shows a block diagram of a design of a UE 120x capable of P2P communication and WAN communication. Within UE 120x, a receiver 1212 may receive P2P signals transmitted by other UEs for P2P communication and downlink signals transmitted by base stations for WAN communication. A transmitter 1214 may transmit P2P signals to other UEs for P2P communication and uplink signals to base stations for WAN communication. A module 1216 may detect the presence of other UEs and base stations and may measure channel gains, received power, etc., of the detected UEs and base stations. A module 1220 may determine an active set of UE 120x based on the measurements made by module 1216. A module 1222 may determine a neighbor set of UE 120x (if applicable) based on the active sets of other UEs communicating with UE 120x and possibly other UEs. A module 1218 may send information indicative of the active set, neighbor set, channel gains, etc. A module 1224 may support P2P communication, e.g., generate and process signals used for P2P communication. A module 1226 may support WAN communication, e.g., generate and process signals used for WAN communication. The various modules within UE 120x may operate as described above. A controller/processor 1228 may direct the operation of various modules within UE 120x. A memory 1230 may store data and program codes for UE 120x.

Figure 13:
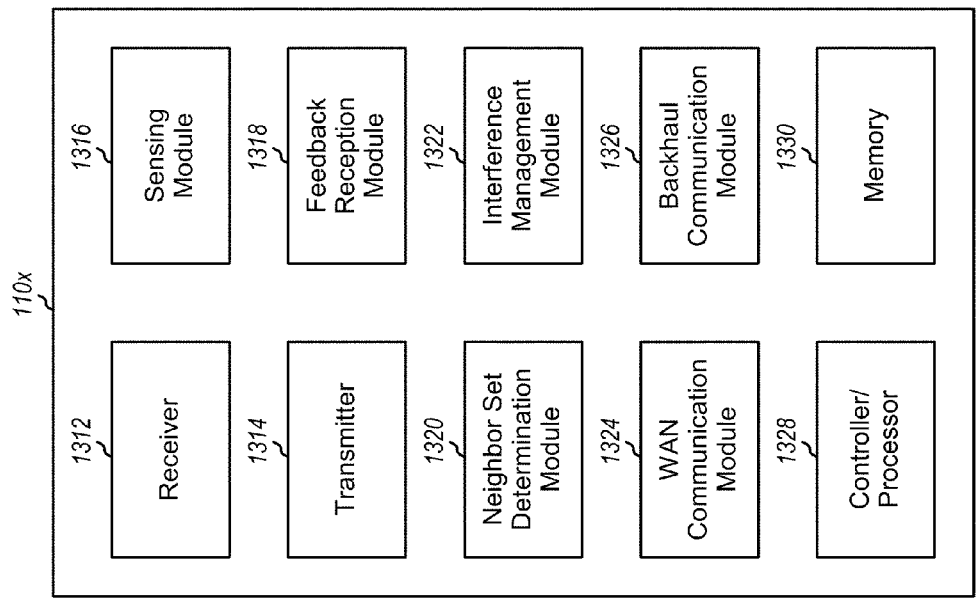
FIG. 13 shows a block diagram of a base station.

FIG. 13 shows a block diagram of a design of a base station 110x supporting P2P communication and WAN communication. Within base station 110x, a receiver 1312 may receive uplink signals transmitted by UEs to support WAN communication and P2P communication. A transmitter 1314 may transmit downlink signals to UEs to support WAN communication and P2P communication. A module 1316 may detect the presence of UEs and may measure channel gains, received power, etc., of the detected UEs. A module 1318 may receive reports from UEs. A module 1320 may determine a neighbor set of base station 110x, e.g., based on the active sets of UEs communicating with base station 110x and possibly other UEs. A module 1322 may perform interference management, e.g., by coordinating with other server nodes. A module 1324 may support WAN communication for UEs, e.g., generate and process signals used for WAN communication. A module 1326 may support communication with other network entities (e.g., base stations) via the backhaul (e.g., for coordinated interference management). The various modules within base station 110x may operate as described above. A controller/processor 1328 may direct the operation of various modules within base station 110x. A memory 1330 may store data and program codes for base station 110x.

The modules within UE 120x in FIG. 12 and the modules within base station 110x in FIG. 13 may comprise processors, electronic devices, hardware devices, electronic components, logical circuits, memories, software codes, firmware codes, etc., or any combination thereof.

Figure 14:
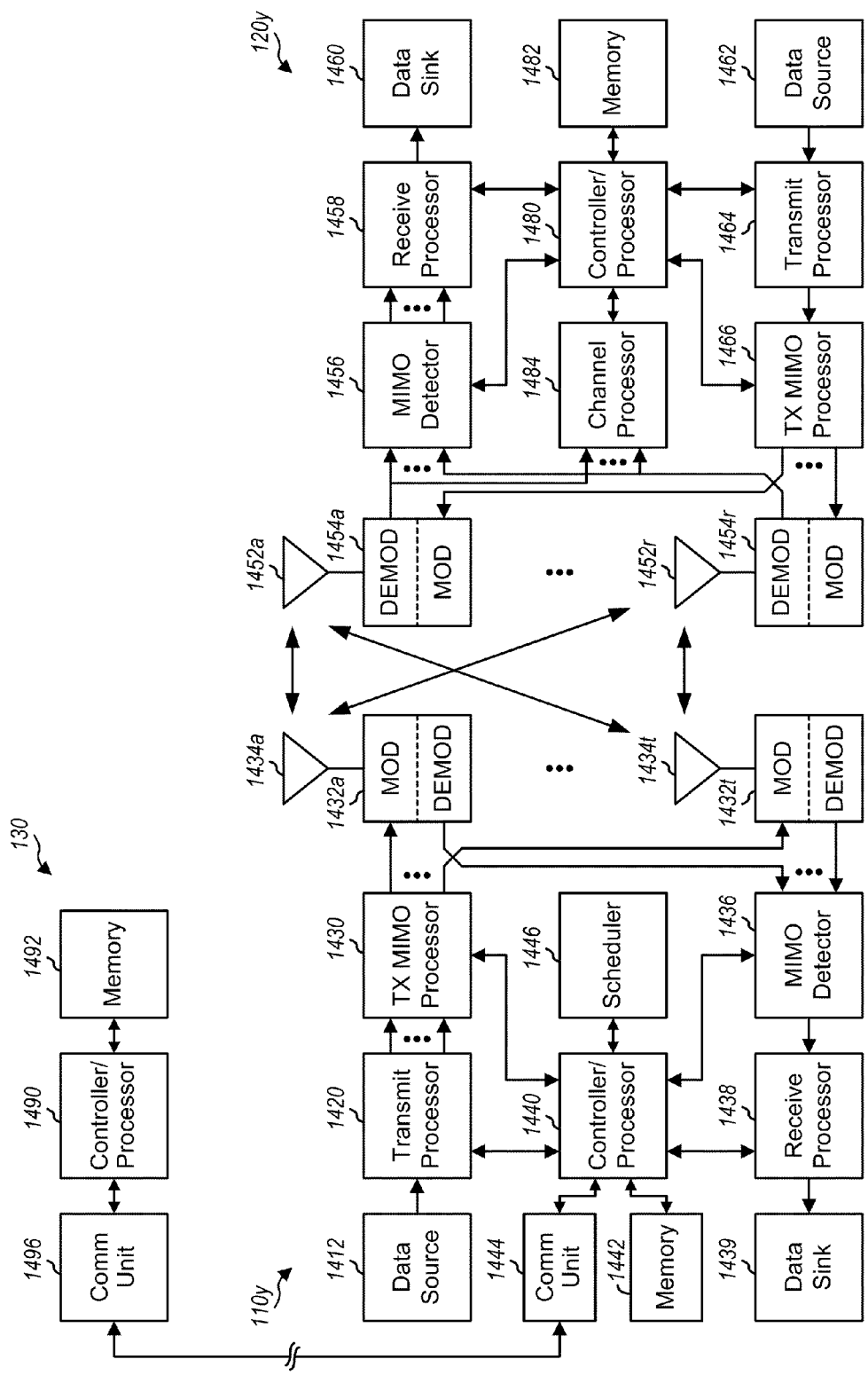
FIG. 14 shows a block diagram of a base station and a UE.

FIG. 14 shows a block diagram of a design of a base station 110y and a UE 120y, which may be one of the base stations and one of the UEs in FIG. 1. Base station 110y may be equipped with T antennas 1434a through 1434t, and UE 120y may be equipped with R antennas 1452a through 1452r, where in general T≥1 and R≥1.

At base station 110y, a transmit processor 1420 may receive data for one or more UEs from a data source 1412 and control information (e.g., messages supporting interference management, P2P communication, WAN communication, etc.) from a controller/processor 1440. Processor 1420 may process (e.g., encode and modulate) the data and control information to obtain data symbols and control symbols, respectively. Processor 1420 may also generate reference symbols for synchronization signals, reference signals, etc. A transmit (TX) multiple-input multiple-output (MIMO) processor 1430 may perform spatial processing (e.g., precoding) on the data symbols, the control symbols, and/or the reference symbols, if applicable, and may provide T output symbol streams to T modulators (MODs) 1432a through 1432t. Each modulator 1432 may process a respective output symbol stream (e.g., for OFDM, etc.) to obtain an output sample stream. Each modulator 1432 may further process (e.g., convert to analog, amplify, filter, and upconvert) the output sample stream to obtain a downlink signal. T downlink signals from modulators 1432a through 1432t may be transmitted via T antennas 1434a through 1434t, respectively.

At UE 120y, antennas 1452a through 1452r may receive the downlink signals from base station 110y, downlink signals from other base stations, and/or P2P signals from other UEs and may provide received signals to demodulators (DE-MODs) 1454a through 1454r, respectively. Each demodulator 1454 may condition (e.g., filter, amplify, downconvert, and digitize) a respective received signal to obtain input samples. Each demodulator 1454 may further process the input samples (e.g., for OFDM, etc.) to obtain received symbols. A MIMO detector 1456 may obtain received symbols from all R demodulators 1454a through 1454r, perform MIMO detection on the received symbols if applicable, and provide detected symbols. A receive processor 1458 may process (e.g., demodulate and decode) the detected symbols, provide decoded data for UE 120y to a data sink 1460, and provide decoded control information to a controller/processor 1480. A channel processor 1484 may detect proximity detection signals from P2P UEs and downlink signals from base stations. Processor 1484 may measure the received signal strength of the detected proximity detection signals and downlink signals and may determine channel gains for the detected P2P UEs and base stations.

On the uplink, at UE 120y, a transmit processor 1464 may receive data from a data source 1462 and control information (e.g., messages for interference management, P2P communication, WAN communication, etc.) from controller/processor 1480. Processor 1464 may process (e.g., encode and modulate) the data and control information to obtain data symbols and control symbols, respectively. Processor 1464 may also generate symbols for a reference signal, a proximity detection signal, etc. The symbols from transmit processor 1464 may be precoded by a TX MIMO processor 1466 if applicable, further processed by modulators 1454a through 1454r (e.g., for SC-FDM, OFDM, etc.), and transmitted to base station 110y, other base stations, and/or other UEs. At base station 110y, the uplink signals from UE 120y and other UEs may be received by antennas 1434, processed by demodulators 1432, detected by a MIMO detector 1436 if applicable, and further processed by a receive processor 1438 to obtain decoded data and control information sent by UE 120y and other UEs. Processor 1438 may provide the decoded data to a data sink 1439 and the decoded control information to controller/processor 1440.

Controllers/processors 1440 and 1480 may direct the operation at base station 110y and UE 120y, respectively. Processor 1480 and/or other processors and modules at UE 120y may perform or direct process 800 in FIG. 8, process 900 in FIG. 9, process 1000 in FIG. 10, process 1100 in FIG. 11, and/or other processes for the techniques described herein. Processor 1440 and/or other processors and modules at base station 110y may perform or direct process 800 in FIG. 8, process 900 in FIG. 9, process 1000 in FIG. 10, and/or other processes for the techniques described herein. Memories 1442 and 1482 may store data and program codes for base station 110y and UE 120y, respectively. A communication (Comm) unit 1444 may enable base station 110y to communicate with other network entities. A scheduler 1446 may schedule UEs for WAN communication and P2P communication.

FIG. 14 also shows a design of network controller 130 in FIG. 1. Within network controller 130, a controller/processor 1490 may perform various functions (e.g., interference management) to support WAN communication and P2P communication. A memory 1492 may store program codes and data for server 140. A communication unit 1496 may enable network controller 130 to communicate with other network entities.

In one configuration, apparatus 110x, 110y, 120x or 120y for wireless communication may include means for determining a set of server nodes including a P2P server and at least one neighbor server node of the P2P server, the P2P server communicating with at least one P2P client, and means for performing interference management for the set of server nodes to reduce interference to the P2P server and/or to the at least one P2P client.

In another configuration, apparatus 110x, 110y, 120x or 120y for wireless communication may include means for determining at least one neighbor server node of a P2P server, the P2P server communicating with at least one P2P client, and means for exchanging information with the at least one neighbor server node by the P2P server for interference management to reduce interference to the P2P server and/or to the at least one P2P client.

In yet another configuration, apparatus 120x or 120y for wireless communication may include means for identifying a set of nodes received with sufficient signal strength by a UE communicating peer-to-peer with at least one other UE, and means for reporting the set of nodes by the UE for use for interference management to reduce interference to the UE.

In an aspect, the aforementioned means may be processor(s) 1420, 1438 and/or 1440 at base station 110y and/or processors(s) 1458, 1464 and/or 1480 at UE 120y, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a set of server nodes including a peer-to-peer (P2P) server and at least one neighbor server node of the P2P server, the P2P server communicating with at least one P2P client, wherein the P2P server is distinct from the P2P client by being a user equipment (UE) designated to perform a management function for P2P transmissions, the P2P client being a UE that is not designated to perform the management function, the management function comprising at least one of exchanging signaling with a Wide Area Network (WAN) or coordinating the P2P transmissions, and the at least one server node comprising one of a base station or another P2P server; and
   performing interference management for the set of server nodes to reduce interference to the P2P server, or to the at least one P2P client, or to both the P2P server and the at least one P2P client, wherein the interference management is performed in a coordinated manner for and by the set of server nodes to mitigate interference between a UE engaged in P2P communication and a UE engaged in WAN communication or between multiple UEs engaged in P2P communication.

2. The method of claim 1, wherein the set of server nodes includes at least one other P2P server, or both the base station and the at least one other P2P server.

3. The method of claim 1, wherein the set of server nodes includes first and second base stations, the first base station serving a user equipment (UE) that receives the second base station with signal strength sufficient to cause interference exceeding a target level.

4. The method of claim 1, wherein the set of server nodes includes a base station that is received with signal strength sufficient to cause interference exceeding a target level by one or more of the at least one P2P client.

5. The method of claim 1, wherein the set of server nodes includes a base station serving a user equipment (UE), the UE receiving the P2P server with signal strength sufficient to cause interference exceeding a target level.

6. The method of claim 1, wherein the set of server nodes includes a base station serving a user equipment (UE), the UE receiving one or more of the at least one P2P client with signal strength sufficient to cause interference exceeding a target level.

7. The method of claim 1, wherein the set of server nodes includes at least one other P2P server that is received with signal strength sufficient to cause interference exceeding a target level by one or more of the at least one P2P client.

8. The method of claim 1, wherein the at least one P2P client is associated with at least one active set, wherein an active set for each P2P client includes nodes received with signal strength sufficient to cause interference exceeding a target level by the P2P client, and wherein the set of server nodes is determined based on the at least one active set of the at least one P2P client.

9. The method of claim 8, wherein the set of server nodes is determined based further on an active set of the P2P server, or one or more active sets of one or more user equipments (UEs) served by one or more base stations, or active sets of both the P2P server and the one or more UEs.

10. The method of claim 1, wherein the performing interference management comprises:
performing interference management for the set of server nodes determined based on P2P downlink subframes of uplink resources allocated for use by the P2P server, and separately performing interference management for a separately determined neighbor set of server nodes determined based on P2P uplink subframes of the uplink resources.

11. The method of claim 1, wherein the performing interference management comprises performing association to select P2P communication or communication via a wireless network for at least one user equipment (UE).

12. The method of claim 1, wherein the performing interference management comprises performing resource partitioning to allocate resources to the set of server nodes.

13. The method of claim 1, wherein the performing interference management comprises performing power control for the set of server nodes.

14. The method of claim 1, wherein the performing interference management comprises performing open-loop power control to reduce interference to the P2P server, or to the at least one P2P client, or to both the P2P server and the at least one P2P client.

15. The method of claim 1, wherein the performing interference management comprises performing closed-loop power control to reduce interference to the P2P server, or to the at least one P2P client, or to both the P2P server and the at least one P2P client.

16. The method of claim 1, wherein the performing interference management comprises setting a transmit power level of the P2P server to mitigate interference to at least one node not served by the P2P server.

17. The method of claim 16, wherein the setting the transmit power level of the P2P server comprises
estimating at least one channel gain for the at least one node,
determining at least one target load level of the at least one node, and
setting the transmit power level of the P2P server based on the at least one channel gain and the at least one target load level of the at least one node.

18. The method of claim 1, wherein the performing interference management comprises setting a transmit power level of a P2P client among the at least one P2P client to mitigate interference to at least one node.

19. The method of claim 18, wherein the setting the transmit power level of the P2P client comprises
estimating a received power of the P2P client at the P2P server,
determining a power control command for the P2P client based on the received power of the P2P client and a target load level for the P2P server, and
sending the power control command to the P2P client.

20. The method of claim 1, wherein the performing interference management comprises allocating resources to the P2P server for communication with the at least one P2P client, the allocated resources having reduced interference from the at least one neighbor server node, or user equipments (UEs) communicating with the at least one neighbor server node, or both the at least one neighbor server node and the UEs.

21. The method of claim 20, wherein the resources allocated to the P2P server are negotiated by a base station associated with the P2P server.

22. The method of claim 20, wherein the allocated resources comprise a set of transmit power levels for a set of resources available for communication between the P2P server and the at least one P2P client.

23. The method of claim 20, wherein the allocated resources comprise a set of target load levels for a set of resources available for communication between the P2P server and the at least one P2P client.

24. The method of claim 1, wherein the performing interference management comprises determining a target load level for the P2P server, or at least one target load level for the at least one P2P client, or both.

25. The method of claim 1, wherein the performing interference management comprises determining a transmit power level for the P2P server, or at least one transmit power level for the at least one P2P client, or both.

26. The method of claim 1, further comprising:
scheduling the P2P server and the at least one P2P client for data transmission by a base station associated with the P2P server.

27. The method of claim 1, further comprising:
detecting a user equipment (UE) causing strong interference to the P2P server, or to the at least one P2P client, or to both the P2P server and the at least one P2P client; and
communicating with a serving base station of the UE to mitigate interference caused by the UE.

28. An apparatus for wireless communication, comprising:
means for determining a set of server nodes including a peer-to-peer (P2P) server and at least one neighbor server node of the P2P server, the P2P server communicating with at least one P2P client, wherein the P2P server is distinct from the P2P client by being a user equipment (UE) designated to perform a management function for P2P transmissions, the P2P client being a UE that is not designated to perform the management function, the management function comprising at least one of exchanging signaling with a Wide Area Network (WAN) or coordinating the P2P transmissions, and the at least one server node comprising one of a base station or another P2P server; and
means for performing interference management for the set of server nodes to reduce interference to the P2P server, or to the at least one P2P client, or to both the P2P server and the at least one P2P client, wherein the interference management is performed in a coordinated manner for and by the set of server nodes to mitigate interference between a UE engaged in P2P communication and a UE engaged in WAN communication or between multiple UEs engaged in P2P communication.

29. The apparatus of claim 28, wherein the at least one P2P client is associated with at least one active set, wherein an active set for each P2P client includes nodes received with signal strength sufficient to cause interference exceeding a target level by the P2P client, and wherein the set of server nodes is determined based on the at least one active set of the at least one P2P client.

30. The apparatus of claim 28, wherein the means for performing interference management comprises
means for performing interference management for the set of server nodes determined based on P2P downlink subframes of uplink resources allocated for use by the P2P server, and
means for performing interference management for a separately determined neighbor set of server nodes determined based on P2P uplink subframes of the uplink resources for the P2P server.

31. The apparatus of claim 28, wherein the means for performing interference management comprises means for allocating resources to the P2P server for communication with the at least one P2P client, the allocated resources having reduced interference from the at least one neighbor server node, or user equipments (UEs) communicating with the at least one neighbor server node, or both the at least one neighbor server node and the UEs.

32. An apparatus for wireless communication, comprising:
at least one processor configured to determine a set of server nodes including a peer-to-peer (P2P) server and at least one neighbor server node of the P2P server, the P2P server communicating with at least one P2P client, wherein the P2P server is distinct from the P2P client by being a user equipment (UE) designated to perform a management function for P2P transmissions, the P2P client being a UE that is not designated to perform the management function, the management function comprising at least one of exchanging signaling with a Wide Area Network (WAN) or coordinating the P2P transmissions, and the at least one server node comprising one of a base station or another P2P server, and to perform interference management for the set of server nodes to reduce interference to the P2P server, or to the at least one P2P client, or to both the P2P server and the at least one P2P client, wherein the interference management is performed in a coordinated manner for and by the set of server nodes to mitigate interference between a UE engaged in P2P communication and a UE engaged in WAN communication or between multiple UEs engaged in P2P communication.

33. The apparatus of claim 32, wherein the at least one P2P client is associated with at least one active set, wherein an active set for each P2P client includes nodes received with signal strength sufficient to cause interference exceeding a target level by the P2P client, and wherein the set of server nodes is determined based on the at least one active set of the at least one P2P client.

34. The apparatus of claim 32, wherein the at least one processor is configured to perform interference management for the set of server nodes in P2P downlink subframes determined based on P2P downlink subframes of uplink resources allocated for use by the P2P server, and to perform interference management for a separately determined neighbor set of server nodes determined based on P2P uplink subframes of the uplink resources for the P2P server.

35. The apparatus of claim 32, wherein the at least one processor is configured to allocate resources to the P2P server for communication with the at least one P2P client, the allocated resources having reduced interference from the at least one neighbor server node, or user equipments (UEs) communicating with the at least one neighbor server node, or both the at least one neighbor server node and the UEs.

36. A computer program product, comprising:
a non-transitory computer-readable medium comprising:
code for causing at least one processor to determine a set of server nodes including a peer-to-peer (P2P) server and at least one neighbor server node of the P2P server, the P2P server communicating with at least one P2P client, the P2P server is distinct from the P2P client by being a user equipment (UE) designated to perform a management function for P2P transmissions, the P2P client being a UE that is not designated to perform the management function, the management function comprising at least one of exchanging signaling with a Wide Area Network (WAN) or coordinating the P2P transmissions, and the at least one server node comprising one of a base station or another P2P server, and code for causing the at least one processor to perform interference management for the set of server nodes to reduce interference to the P2P server, or to the at least one P2P client, or to both the P2P server and the at least one P2P client, wherein the interference management is performed in a coordinated manner for and by the set of server nodes to mitigate interference between a UE engaged in P2P communication and a UE engaged in WAN communication or between multiple UEs engaged in P2P communication.

37. A method for wireless communication, comprising:
determining at least one neighbor server node of a peer-to-peer (P2P) server, the P2P server communicating with at least one P2P client, wherein the P2P server is distinct from the P2P client by being a user equipment (UE) designated to perform a management function for P2P transmissions, the P2P client being a UE that is not designated to perform the management function, the management function comprising at least one of exchanging signaling with a Wide Area Network (WAN) or coordinating the P2P transmissions, and the at least one server node comprising one of a base station or another P2P server; and
exchanging information with the at least one neighbor server node by the P2P server for interference management to reduce interference to the P2P server, or to the at least one P2P client, or to both the P2P server and the at least one P2P client, wherein the interference management is performed in a coordinated manner with the at least one neighbor server node to mitigate interference between a UE engaged in P2P communication and a UE engaged in WAN communication or between multiple UEs engaged in P2P communication.

38. The method of claim 37, wherein the exchanging information comprises sending information indicative of at least one active set of the at least one P2P client, wherein an active set of each P2P client includes nodes received with signal strength sufficient to cause interference exceeding a target level by the P2P client.

39. The method of claim 37, wherein the exchanging information comprises sending information indicative of a neighbor set for the P2P server, the neighbor set including at least one server node with which to coordinate interference management.

40. The method of claim 37, wherein the exchanging information comprises sending information indicative of local metrics computed by the P2P server, each local metric indicative of performance for a possible action for interference management by the P2P server.

41. The method of claim 37, wherein the at least one neighbor server node and the P2P server are members of a set of server nodes cooperating for interference management.

42. The method of claim 37, wherein the at least one neighbor server node and the P2P server cooperate for interference management in downlink subframes in which the P2P server transmits to the at least one P2P client.

43. The method of claim 37, wherein the at least one neighbor server node and the P2P server cooperate for interference management in uplink subframes in which the at least one P2P client transmits to the P2P server.

44. The method of claim 37, wherein the exchanging information comprises exchanging information with the at least one neighbor server node to allocate resources to the P2P server for communication with the at least one P2P client.

45. The method of claim 37, wherein the exchanging information comprises exchanging information with the at least one neighbor server node to determine a target load level for the P2P server, or at least one target load level for the at least one P2P client, or both.

46. The method of claim 37, wherein the exchanging information comprises exchanging information with the at least one neighbor server node to determine a transmit power level for the P2P server, or at least one transmit power level for the at least one P2P client, or both.

47. An apparatus for wireless communication, comprising:
means for determining at least one neighbor server node of a peer-to-peer (P2P) server, the P2P server communicating with at least one P2P client, wherein the P2P server is distinct from the P2P client by being a user equipment (UE) designated to perform a management function for P2P transmissions, the P2P client being a UE that is not designated to perform the management function, the management function comprising at least one of exchanging signaling with a Wide Area Network (WAN) or coordinating the P2P transmissions, and the at least one server node comprising one of a base station or another P2P server; and
means for exchanging information with the at least one neighbor server node by the P2P server for interference management to reduce interference to the P2P server, or to the at least one P2P client, or to both the P2P server and the at least one P2P client, wherein the interference management is performed in a coordinated manner with the at least one neighbor server node to mitigate interference between a UE engaged in P2P communication and a UE engaged in WAN communication or between multiple UEs engaged in P2P communication.

48. The apparatus of claim 47, wherein the means for exchanging information comprises means for sending information indicative of at least one active set of the at least one P2P client, wherein an active set of each P2P client includes nodes received with signal strength sufficient to cause interference exceeding a target level by the P2P client.

49. The apparatus of claim 47, wherein the means for exchanging information comprises means for sending information indicative of a neighbor set for the P2P server, the neighbor set including at least one server node with which to coordinate interference management.

50. The apparatus of claim 47, wherein the means for exchanging information comprises means for sending information indicative of local metrics computed by the P2P server, each local metric indicative of performance for a possible action for interference management by the P2P server.

51. An apparatus for wireless communication, comprising:
at least one processor configured to determine at least one neighbor server node of a peer-to-peer (P2P) server, the P2P server communicating with at least one P2P client, wherein the P2P server is distinct from the P2P client by being a user equipment (UE) designated to perform a management function for P2P transmissions, the P2P client being a UE that is not designated to perform the management function, the management function comprising at least one of exchanging signaling with a Wide Area Network (WAN) or coordinating the P2P transmissions, and the at least one server node comprising one of a base station or another P2P server, and to exchange information with the at least one neighbor server node by the P2P server for interference management to reduce interference to the P2P server, or to the at least one P2P client, or to both the P2P server and the at least one P2P client, wherein the interference management is performed in a coordinated manner with the at least one neighbor server node to mitigate interference between a UE engaged in P2P communication and a UE engaged in WAN communication or between multiple UEs engaged in P2P communication.

52. The apparatus of claim 51, wherein the at least one processor is configured to send information indicative of at least one active set of the at least one P2P client, wherein an active set of each P2P client includes nodes received with signal strength sufficient to cause interference exceeding a target level by the P2P client.

53. The apparatus of claim 51, wherein the at least one processor is configured to send information indicative of a neighbor set for the P2P server, the neighbor set including at least one server node with which to coordinate interference management.

54. The apparatus of claim 51, wherein the at least one processor is configured to send information indicative of local metrics computed by the P2P server, each local metric indicative of performance for a possible action for interference management by the P2P server.

55. A computer program product, comprising:
a non-transitory computer-readable medium comprising:
code for causing at least one processor to determine at least one neighbor server node of a peer-to-peer (P2P) server, the P2P server communicating with at least one P2P client, wherein the P2P server is distinct from the P2P client by being a user equipment (UE) designated to perform a management function for P2P transmissions, the P2P client being a UE that is not designated to perform the management function, the management function comprising at least one of exchanging signaling with a Wide Area Network (WAN) or coordinating the P2P transmissions, and the at least one server node comprising one of a base station or another P2P server, and
code for causing the at least one processor to exchange information with the at least one neighbor server node by the P2P server for interference management to reduce interference to the P2P server, or to the at least one P2P client, or to both the P2P server and the at least one P2P client, wherein the interference management is performed in a coordinated manner with the at least one neighbor server node to mitigate interference between a UE engaged in P2P communication and a UE engaged in WAN communication or between multiple UEs engaged in P2P communication.

56. A method for wireless communication, comprising:
identifying a set of nodes received with signal strength sufficient to cause interference exceeding a target level by a user equipment (UE) designated to perform a management function for P2P transmissions and communicating peer-to-peer (P2P) with at least one other UE that is not designated to perform the management function, the management function comprising at least one of exchanging signaling with a Wide Area Network (WAN) or coordinating the P2P transmissions; and
reporting the set of nodes by the UE to at least one neighbor server node comprising one of a base station or another P2P server for use for interference management to reduce interference to the UE, wherein the interference management is performed in a coordinated manner with the at least one neighbor server node to mitigate interference between the UE engaged in P2P communication and a UE engaged in WAN communication or between the UE and another UE engaged in P2P communication.

57. The method of claim 56, wherein the UE comprises a P2P server communicating with at least one P2P client, and wherein the set of nodes comprises at least one UE, or at least one other P2P client, or both at least one UE and at least one other P2P client received with signal strength causing strong interference to the P2P server.

58. The method of claim 56, wherein the UE comprises a P2P client communicating with a P2P server, and wherein the set of nodes comprises at least one UE, or at least one other P2P server, or both at least one UE and at least one other P2P server received with signal strength causing strong interference to the P2P client.

59. An apparatus for wireless communication, comprising:
   means for identifying a set of nodes received with signal strength sufficient to cause interference exceeding a target level by a user equipment (UE) designated to perform a management function for P2P transmissions and communicating peer-to-peer (P2P) with at least one other UE that is not designated to perform the management function, the management function comprising at least one of exchanging signaling with a Wide Area Network (WAN) or coordinating the P2P transmissions; and
   means for reporting the set of nodes by the UE to at least one neighbor server node comprising one of a base station or another P2P server for use for interference management to reduce interference to the UE, wherein the interference management is performed in a coordinated manner with the at least one neighbor server node to mitigate interference between the UE engaged in P2P communication and a UE engaged in WAN communication or between the UE and another UE engaged in P2P communication.

60. The apparatus of claim 59, wherein the UE comprises a P2P server communicating with at least one P2P client, and wherein the set of nodes comprises at least one UE, or at least one other P2P client, or both at least one UE and at least one other P2P client received with signal strength causing strong interference to the P2P server.

61. The apparatus of claim 59, wherein the UE comprises a P2P client communicating with a P2P server, and wherein the set of nodes comprises at least one UE, or at least one other P2P server, or both at least one UE and at least one other P2P server received with signal strength causing strong interference to the P2P client.

62. An apparatus for wireless communication, comprising:
   at least one processor configured to identify a set of nodes received with signal strength sufficient to cause interference exceeding a target level by a user equipment (UE) designated to perform a management function for P2P transmissions and communicating peer-to-peer (P2P) with at least one other UE that is not designated to perform the management function, the management function comprising at least one of exchanging signaling with a Wide Area Network (WAN) or coordinating the P2P transmissions, and to report the set of nodes by the UE to at least one neighbor server node comprising one of a base station or another P2P server for use for interference management to reduce interference to the UE, wherein the interference management is performed in a coordinated manner with the at least one neighbor server node to mitigate interference between the UE engaged in P2P communication and a UE engaged in WAN communication or between the UE and another UE engaged in P2P communication.

63. The apparatus of claim 62, wherein the UE comprises a P2P server communicating with at least one P2P client, and wherein the set of nodes comprises at least one UE, or at least one other P2P client, or both at least one UE and at least one other P2P client received with signal strength causing strong interference to the P2P server.

64. The apparatus of claim 62, wherein the UE comprises a P2P client communicating with a P2P server, and wherein the set of nodes comprises at least one UE, or at least one other P2P server, or both at least one UE and at least one other P2P server received with signal strength causing strong interference to the P2P client.

65. A computer program product, comprising:
   a non-transitory computer-readable medium comprising:
      code for causing at least one processor to identify a set of nodes received with signal strength sufficient to cause interference exceeding a target level by a user equipment (UE) designated to perform a management function for P2P transmissions and communicating peer-to-peer (P2P) with at least one other UE that is not designated to perform the management function, the management function comprising at least one of exchanging signaling with a Wide Area Network (WAN) or coordinating the P2P transmissions, and
      code for causing the at least one processor to report the set of nodes by the UE to at least one neighbor server node comprising one of a base station or another P2P server for use for interference management to reduce interference to the UE, wherein the interference management is performed in a coordinated manner with the at least one neighbor server node to mitigate interference between the UE engaged in P2P communication and a UE engaged in WAN communication or between the UE and another UE engaged in P2P communication.

\* \* \* \* \*